· US011796311B2

(12) United States Patent
Chen et al.

(10) Patent No.: US 11,796,311 B2
(45) Date of Patent: Oct. 24, 2023

(54) LIGHT EMITTING DEVICE, OPTICAL DETECTION SYSTEM, OPTICAL DETECTION DEVICE AND OPTICAL DETECTION METHOD

(71) Applicant: SKYVERSE TECHNOLOGY CO., LTD., Guangdong (CN)

(72) Inventors: Lu Chen, Guangdong (CN); Le Yang, Guangdong (CN); Yanzhong Ma, Beijing (CN); Chaoqian Zhang, Beijing (CN)

(73) Assignee: SKYVERSE TECHNOLOGY CO., LTD., Guangdong (CN)

( * ) Notice: Subject to any disclaimer, the term of this patent is extended or adjusted under 35 U.S.C. 154(b) by 74 days.

(21) Appl. No.: 17/263,560

(22) PCT Filed: Jul. 23, 2019

(86) PCT No.: PCT/CN2019/097224
§ 371 (c)(1),
(2) Date: Jan. 27, 2021

(87) PCT Pub. No.: WO2020/020130
PCT Pub. Date: Jan. 30, 2020

(65) Prior Publication Data
US 2021/0148698 A1 May 20, 2021

(30) Foreign Application Priority Data

Jul. 27, 2018 (CN) .......................... 201810846138.1
Sep. 3, 2018 (CN) .......................... 201811022876.0

(51) Int. Cl.
*G01B 11/24* (2006.01)
*G01B 9/02015* (2022.01)
(Continued)

(52) U.S. Cl.
CPC ............ *G01B 11/24* (2013.01); *G01B 9/0209* (2013.01); *G01B 9/02015* (2013.01);
(Continued)

(58) Field of Classification Search
CPC ........................... G01B 11/24; G01B 2210/56
See application file for complete search history.

(56) References Cited

U.S. PATENT DOCUMENTS 5,561,525 A     10/1996  Toyonaga et al.
7,869,057 B2 *  1/2011   De Groot ............. G01B 9/0209
                                                   356/511
(Continued)

FOREIGN PATENT DOCUMENTS

CN         1421045 A      5/2003
CN       101520304 A      9/2009
(Continued)

OTHER PUBLICATIONS

International Search Report for PCT/CN2019/097224 dated Sep. 26, 2019, ISA/CN.
(Continued)

*Primary Examiner* — Michael A Lyons
(74) *Attorney, Agent, or Firm* — Yue (Robert) Xu; Apex Attorneys at Law, LLP

(57) ABSTRACT

A light emitting device, an optical detection system, an optical detection device and an optical detection method, the light emitting device comprising: a light source (01), and an aperture limiting unit (03) located on an emergent light path of the light source (01); the light source (01) is used to emit light; and the aperture limiting unit (03) is used to limit the aperture of light emitted by the light source (01) when a current detection area of an object to be tested (05) has a
(Continued)

high aspect ratio structure so as to block a portion of light having a large included angle with the normal direction of the object to be tested (05).

28 Claims, 13 Drawing Sheets

(51) Int. Cl.
*G01B 11/00* (2006.01)
*G01B 11/03* (2006.01)
*G01B 11/06* (2006.01)
*G01B 9/0209* (2022.01)

(52) U.S. Cl.
CPC ............ *G01B 11/002* (2013.01); *G01B 11/03* (2013.01); *G01B 11/06* (2013.01); *G01B 11/2441* (2013.01); *G01B 2210/56* (2013.01)

(56) References Cited

U.S. PATENT DOCUMENTS

| | | |
|---|---|---|
| 2002/0039184 A1 | 4/2002 | Sandusky |
| 2003/0222049 A1 | 12/2003 | Mundt |
| 2010/0019157 A1 | 1/2010 | Furlan et al. |
| 2010/0284027 A1 | 11/2010 | Scheiner |
| 2011/0001988 A1* | 1/2011 | Pahk .................. G01B 11/0625 356/630 |
| 2011/0188048 A1 | 8/2011 | Pahk et al. |
| 2013/0148877 A1* | 6/2013 | Claypool ............... G01N 21/25 382/145 |
| 2013/0308131 A1 | 11/2013 | Barak et al. |
| 2014/0036273 A1* | 2/2014 | Lee ........................ G01B 11/24 356/511 |
| 2014/0293081 A1 | 10/2014 | Wu et al. |
| 2015/0070472 A1 | 3/2015 | Chen et al. |
| 2016/0313655 A1* | 10/2016 | Yue ....................... G01B 9/0203 |
| 2017/0146339 A1* | 5/2017 | Wei ........................ G01B 11/22 |

FOREIGN PATENT DOCUMENTS

| | | |
|---|---|---|
| CN | 102077051 A | 5/2011 |
| CN | 102082108 A | 6/2011 |
| CN | 102589414 A | 7/2012 |
| CN | 103438805 A | 12/2013 |
| CN | 103759675 A | 4/2014 |
| CN | 105277131 A | 1/2016 |
| CN | 106441143 A | 2/2017 |
| CN | 106840027 A | 6/2017 |
| CN | 106959293 A | 7/2017 |
| CN | 107036539 A | 8/2017 |
| CN | 108917625 A | 11/2018 |
| CN | 109084678 A | 12/2018 |
| JP | 2004510972 A | 4/2004 |
| JP | 2013195263 A | 9/2013 |
| JP | 2016038284 A | 3/2016 |
| JP | 5989671 B2 | 9/2016 |
| KR | 20100096199 A | 9/2010 |
| KR | 20130012412 A | 2/2013 |
| KR | 20130012419 A | 2/2013 |
| TW | I485361 B | 5/2015 |
| TW | I573984 B | 3/2017 |

OTHER PUBLICATIONS

The 1st Office Action dated Jan. 2, 2020 for the Chinese Patent Application No. CN201811022876.0.
The 2nd Office Action dated Jul. 24, 2020 for the Chinese Patent Application No. CN201811022876.0.
The 1st Office Action dated Dec. 30, 2019 for the Chinese Patent Application No. CN201810846138.1.
The 2nd Office Action dated Jul. 22, 2020 for the Chinese Patent Application No. CN201810846138.1.
The Korean 1st Office Action dated Oct. 4, 2022 for KR10-2021-7006012.
The Singapore 1st Office Action dated Aug. 2, 2022 for SG11202100892P.

* cited by examiner

LIGHT EMITTING DEVICE, OPTICAL DETECTION SYSTEM, OPTICAL DETECTION DEVICE AND OPTICAL DETECTION METHOD

The present application is the U.S. national phase of International Application No. PCT/CN2019/097224, titled "LIGHT EMITTING DEVICE, OPTICAL DETECTION SYSTEM, OPTICAL DETECTION DEVICE AND OPTICAL DETECTION METHOD", filed on Jul. 23, 2019, which claims priority to Chinese Patent Application No. 201811022876.0, titled "OPTICAL DETECTION APPARATUS AND OPTICAL DETECTION METHOD", filed on Sep. 3, 2018, with the China National Intellectual Property Administration, and to Chinese Patent Application No. 201810846138.1, titled "LIGHT EMITTING APPARATUS, OPTICAL DETECTION SYSTEM AND OPTICAL DETECTION METHOD", filed on Jul. 27, 2018, with the China National Intellectual Property Administration. All the above applications are incorporated herein by reference in their entirety.

FIELD

The present disclosure relates to the technical field of optical detection, and in particular to a light emitting apparatus, an optical detection system, an optical detection apparatus and an optical detection method.

BACKGROUND

With the development of modern science and technology, a size of a semiconductor chip continually decreases, and a processing technology of the semiconductor chip is continually updated. However, many steps are required to process the semiconductor chip, and chip non-conformance generated in any processing step may lead to failure of the whole chip. Therefore, in the conventional technologies, a chip detection process is generally introduced after a key processing step. By detecting information such as a three-dimensional surface contour and a film thickness of each chip, an unqualified chip can be eliminated in time, and a qualified rate of chip products can be improved.

Optical detection is one of main methods for detecting a semiconductor chip. In the optical detection method, light emitted by a light source is incident on a surface of an object to be detected. Information such as a three-dimensional surface contour and a film thickness of the chip is obtained based on reflected light formed by reflection of the object to be detected. However, in detecting a high aspect ratio structure on the chip with the optical detection method, as shown in FIG. 1, as for the high aspect ratio structure, a ratio of a depth D to a width L is large, most of light $\alpha 1$ incident on the surface of the object to be detected at a large angle in the light emitted by the light source may be blocked by a surrounding structure and only a small part of the emitted light, light $\alpha 2$, incident on the surface of the object to be detected at a small angle may be incident to a bottom of the high aspect ratio structure, resulting in that an effective reflected light signal formed by the light incident on the surface of the object to be detected at a small angle is submerged in a noise signal formed by the light incident on the surface of the object to be detected at a large angle, and thus the high aspect ratio structure on the chip cannot be detected effectively.

SUMMARY

In view of the above, a light emitting apparatus, an optical detection system and an optical detection method are provided according to the present disclosure, to solve the problem that the conventional optical detection method cannot detect a high aspect ratio structure on a chip.

In order to realize the above objective, the following technical solutions are provided according to the present disclosure.

A light emitting apparatus includes a light source and an aperture limiting unit arranged in a light emitting path of the light source.

The light source is configured to emit light.

The aperture limiting unit includes a first stop module. The first stop module is configured to enter and leave the light emitting path of the light source, and limit an aperture of the light emitted by the light source when the first stop module is in the light emitting path of the light source, to block light at a large angle with a normal direction of an object to be detected.

Preferably, the aperture limiting unit includes a control module.

The control module is configured to control the first stop module to enter the light emitting path of the light source in a case that a current detection area of the object to be detected has a high aspect ratio structure, and control the first stop module to leave the light emitting path of the light source in a case that the current detection area of the object to be detected does not have a high aspect ratio structure.

Preferably, the light emitting apparatus further includes an objective lens. The objective lens is configured to receive light from the first stop module or the light source and project received light onto a surface of the object to be detected.

The first stop module includes a first stop. In a case that the first stop module is in the light emitting path of the light source, the first stop is at an entrance pupil of the objective lens.

Alternatively, the first stop module includes a first stop and a matching lens. In a case that the first stop module is in the light emitting path of the light source, the matching lens forms an image of the first stop at the entrance pupil of the objective lens.

Preferably, the control module includes a controller and a first movable device.

The controller is configured to determine whether the current detection area has a high aspect ratio structure based on pre-stored structure data of the object to be detected, send a first control instruction to the first movable device in a case that the current detection area has a high aspect ratio structure, to control the first movable device to drive the first stop module to enter the light emitting path of the light source, and send a second control instruction to the first movable device in a case that the current detection area does not have a high aspect ratio structure, to control the first movable device to drive the first stop module to leave the light emitting path of the light source.

An optical detection system includes the light emitting device according to any one of the above and a receiving device.

Light emitted by the light emitting apparatus is reflected by the object to be detected.

The receiving device is configured to receive light reflected by the object to be detected and obtain structure information of the object to be detected based on the received light.

Preferably, the light emitting apparatus includes an objective lens, and the optical detection system further includes a first lens group, a beam splitter and a second lens group.

The first lens group is configured to perform beam expansion and shaping on the light emitted by the light source.

The beam splitter is configured to reflect emergent light from the first lens group or the aperture limiting unit.

The objective lens is configured to focus the emergent light from the first lens group or emergent light from the first stop module on the object to be detected and collect reflected light from the object to be detected.

The beam splitter is further configured to transmit emergent light from the objective lens to the second lens group.

The second lens group is configured to converge the emergent light from the objective lens to the receiving device.

Preferably, the objective lens is an interference objective lens, the receiving device is a photoelectric detector, and the optical detection system further includes a second movable device.

The interference objective lens is further configured to, after collecting the reflected light from the object to be detected, cause the reflected light to interfere with reference light, and transmit interference light to the beam splitter.

The second movable device is configured to drive the interference objective lens or the object to be detected to move along a direction perpendicular to the object to be detected.

The photoelectric detector is configured to reconstruct a three-dimensional surface contour of the object to be detected based on received interference light.

Preferably, the objective lens is an imaging objective lens, the receiving device is a spectrometer, and a second stop is arranged at a light inlet of the spectrometer.

The second stop is configured to limit an aperture of emergent light entering the spectrometer.

The spectrometer is configured to obtain film thickness information of the object to be detected based on the emergent light.

An optical detection method, applied to the optical detection system according to any one of the above, includes:

emitting light by the light source, and moving the first stop module in the aperture limiting unit into the light emitting path of the light source to limit the aperture of the light emitted by the light source, to block light at a large angle with the normal direction of the object to be detected.

Preferably, the aperture limiting unit includes a control module, and the method further includes:

controlling, by the control module in a case that the current detection area of the object to be detected has a high aspect ratio structure, the first stop module to enter the light emitting path of the light source, and controlling, by the control module in a case that the current detection area of the object to be detected does not have a high aspect ratio structure, the first stop module to leave the light emitting path of the light source.

Preferably, in a case that the light emitting apparatus includes an objective lens and the first stop module includes a first stop, the step of controlling the first stop module to enter the light emitting path of the light source includes: arranging the first stop at an entrance pupil of the objective lens; and in a case that the light emitting apparatus includes an objective lens and the first stop module includes a first stop and a matching lens, the step of controlling the first stop module to enter the light emitting path of the light source includes: rendering an image of the first stop formed by the matching lens at the entrance pupil of the objective lens.

Preferably, the control module includes a controller and a first movable device, and the method further includes:

determining, by the controller based on pre-stored structure data of the object to be detected, whether the current detection area has a high aspect ratio structure, sending, by the controller in a case that the current detection area has a high aspect ratio structure, a first control instruction to the first movable device, to control the first movable device to drive the first stop module to enter the light emitting path of the light source, and sending, by the controller in a case that the current detection area does not have a high aspect ratio structure, a second control instruction to the first movable device to control the first movable device to drive the first stop module to leave the light emitting path of the light source.

Compared with the conventional technologies, the technical solutions according to the present disclosure have the following advantages. With the light emitting apparatus, the optical detection system and the optical detection method according to the present disclosure, in a case that a current detection area of an object to be detected has a high aspect ratio structure, a first stop module in an aperture limiting unit enters a light emitting path of a light source to limit an aperture of light emitted by the light source, so as to block light at a large angle with a normal direction of the object to be detected, such that the light is incident to the current detection area of the object to be detected along the normal direction of the object to be detected or along a direction at a small angle with the normal direction, thereby detecting the high aspect ratio structure in the current detection area effectively.

An optical detection apparatus includes a light source module, a projecting unit, and a receiving unit. The light source module includes a light source and an aperture limiting module.

The light source is configured to emit detection light.

The aperture limiting module is configured to enter and leave a light emitting path of the light source, and limit an aperture of the detection light emitted by the light source when the aperture limiting module is in the light emitting path of the light source, to block light at a large angle with a normal direction of an object to be detected.

The projecting unit includes at least one projecting device. The projecting device is configured to project the detection light emitted by the light source module to a surface of the object to be detected, collect reflected light from the object to be detected, and emit detection signal light.

The receiving unit is configured to receive the detection signal light and obtain image information and structure information of an area to be detected of the object to be detected based on the detection signal light.

Optionally, the optical detection apparatus further includes a first movable device, and the first movable device is configured to control the aperture limiting module to enter and leave the light emitting path of the light source.

Optionally, the projecting device is an objective lens, and the aperture limiting module includes a first stop, and in a case that the aperture limiting module is in the light emitting path of the light source, the first stop is at an entrance pupil of the objective lens.

Alternatively, the aperture limiting module includes a first stop and a matching lens. In a case that the aperture limiting module is in the light emitting path of the light source, the matching lens forms an image of the first stop at the entrance pupil of the objective lens.

Optionally, the optical detection apparatus further includes a controller, and the controller is configured to determine, based on the image information, whether the area to be detected of the object to be detected has a specific detection structure, and send, in a case that the area to be detected has the specific detection structure, a first control instruction to the first movable device, to control the first movable device to drive the aperture limiting module to enter the light emitting path of the light source.

Optionally, the specific detection structure includes a high aspect ratio structure.

Optionally, the projecting unit includes a switching device and at least two projecting devices, and the switching device is configured to switch between projecting devices in the light emitting path of the light source module, where different projecting devices emit different detection signal light.

Optionally, the at least two projecting devices include a first projecting device and a second projecting device, the first projecting device is configured to project part of the detection light emitted by the light source module to the surface of the object to be detected, transform part of the detection light into reference light, collect reflected light formed by the object to be detected reflecting the detection light, cause the reflected light to interfere with the reference light, and transmit interference light to the receiving unit, where the interference light is detection signal light emitted by the first projecting device, and the second projecting device is configured to project the detection light emitted by the light source module to the surface of the object to be detected, collect reflected light from the object to be detected, and transmit the reflected light to the receiving unit, where the reflected light is detection signal light emitted by the second projecting device.

Optionally, the structure information includes three-dimensional coordinate information of the object to be detected, the receiving unit includes a first receiving device, and the first receiving device is configured to generate the three-dimensional coordinate information of the object to be detected based on the detection signal light from the first projecting device and generate the image information of the object to be detected based on the detection signal light from the second projecting device.

Optionally, the structure information further includes film thickness information of the area to be detected, the receiving unit further includes a second receiving device, and the second receiving device obtains the film thickness information of the area to be detected of the object to be detected based on the detection signal light from the second projecting device.

Optionally, the first projecting device is an interference objective lens, the second projecting device is an imaging objective lens, and the first receiving device includes an image sensor.

Optionally, the projecting unit includes a projecting device, the projecting device is configured to, after collecting the reflected light from the object to be detected, transmit the reflected light to the receiving unit, where the reflected light is detection signal light emitted by the projecting device, the structure information includes film thickness information of the area to be detected of the object to be detected, the receiving unit includes a first receiving device and a second receiving device, the first receiving device is configured to obtain the image information of the object to be detected based on detection signal light, and the second receiving device is configured to obtain the film thickness information of the object to be detected based on the detection signal light.

Optionally, the projecting device is an imaging objective lens, the first receiving device is an image sensor, and the second receiving device is a spectrometer.

An optical detection method includes:

obtaining image information of an area to be detected of an object to be detected, determining whether the area to be detected has a specific detection structure based on the image information, and performing a detection process on the object to be detected, where the detection process includes:

performing a specific detection on the area to be detected in a case that the object to be detected has the specific detection structure, where the specific detection includes: emitting first detection light to the area to be detected, limiting an aperture of the first detection light to block light at a large angle with a normal direction of the object to be detected, and obtaining structure information of the specific detection structure after the first detection light is limited.

Optionally, the object to be detected includes multiple areas to be detected, before the detection process is performed on the object to be detected, the optical detection method further includes: repeating the steps of obtaining image information and determining whether an area to be detected has a specific detection structure, the specific detection further includes: obtaining position information of the specific structure based on the image information, and obtaining the structure information of the specific structure based on the position information.

Alternatively, the optical detection method includes:

repeating the steps from obtaining image information of an area to be detected of an object to be detected to performing a detection process, including:

determining, after obtaining image information of a previous area to be detected and before obtaining image information of an area to be detected following the previous area to be detected, whether the previous area to be detected has the specific detection structure based on the image information of the previous area to be detected, and performing the specific detection on the previous area to be detected in a case that the previous area to be detected has the specific detection structure.

Optionally, the optical detection method is applied to the optical detection apparatus according to any one of the above, the detection light includes the first detection light or second detection light, and the step of obtaining the image information of the area to be detected of the object to be detected includes:

emitting, by the light source, the second detection light, projecting, by the projecting device, the second detection light to the surface of the object to be detected, collecting reflected light formed by the object to be detected reflecting the detection light, emitting detection signal light, and receiving, by the receiving unit, the detection signal light and obtaining the image information of the area to be detected of the object to be detected based on the detection signal light, and the step of obtaining the structure information of the specific detection structure in the specific detection includes:

collecting, by the projecting device, detection signal light formed by the specific detection structure reflecting the first detection light, and obtaining, by the receiving unit, the structure information of the specific detection structure based on the detection signal light.

Optionally, the step of limiting the aperture of the first detection light includes:

moving the aperture limiting module into the light emitting path of the light source, to limit the aperture of the first detection light.

Optionally, the projecting unit includes a first projecting device, a second projecting device and a switching device, before the detection light is projected to the surface of the object to be detected, the step of obtaining the image information includes: controlling the second projecting device to enter the light emitting path of the light source, the specific detection further includes: controlling, by means of the switching device, the first projecting device to enter the light emitting path of the light source and the second projecting device to move out of the light emitting path of the light source.

Optionally, the receiving unit includes a first receiving device and a second receiving device, the projecting unit includes a second projecting device, and the structure information includes film thickness information; and the optical detection method includes:

projecting, by the second projecting device, the second detection light to the surface of the object to be detected, collecting the reflected light formed by the object to be detected reflecting the second detection light, and emitting detection signal light;

receiving, by the first receiving device, the detection signal light, and obtaining the image information of the area to be detected of the object to be detected based on the detection signal light; and collecting, by the second projecting device, the detection signal light formed by the specific detection structure reflecting the first detection light, and obtaining, by the second receiving device, film thickness information of the specific detection structure.

Compared with the conventional technologies, the technical solutions according to the present disclosure have the following advantages.

With the optical detection apparatus and the optical detection method according to the present disclosure, structure information and image information of the object to be detected can be obtained. Based on the image information, whether an area to be detected of the object to be detected has a specific detection structure and a position of the specific detection structure can be determined. The specific detection structure is detected based on the position. In addition, an aperture limiting module can limit an aperture of detection light emitted by the light source, to block light at a large angle with the normal direction of the object to be detected, such that the light is incident to the detection area of the object to be detected along the normal direction of the object to be detected or along a direction at a small angle with the normal direction, thereby detecting the specific detection structure in the area to be detected effectively.

BRIEF DESCRIPTION OF THE DRAWINGS

In order to clearly describe the technical solutions in the embodiments of the present disclosure or the technical solutions in the conventional technologies, drawings to be used in the descriptions of the embodiments or the conventional technologies are briefly described hereinafter. It is apparent that the drawings described below merely show the embodiments of the present disclosure, and those skilled in the art may obtain other drawings according to the provided drawings without any creative effort.

DETAILED DESCRIPTION OF EMBODIMENTS

Figure 1:
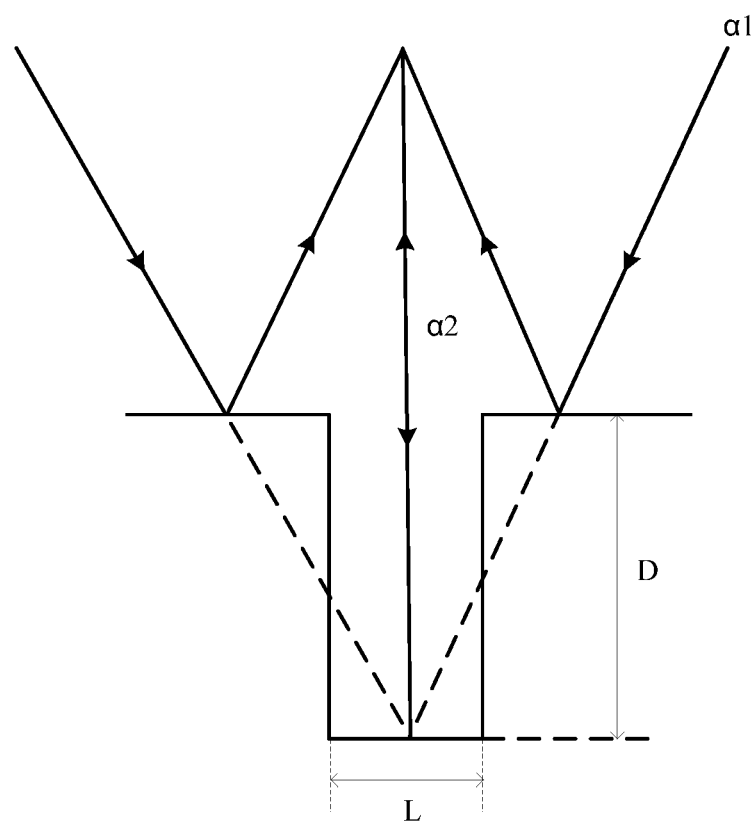
FIG. 1 is a schematic diagram of an optical path in detecting a high aspect ratio structure in the conventional technologies.

As described in the background, the conventional optical detection method cannot effectively detect a high aspect ratio structure in a chip. In the conventional technologies, SEM (scanning electron microscope) may be used to detect a high aspect ratio structure. However, with the method, the high aspect ratio structure is required to be cut open to form an image, that is, the method is destructive. Therefore, the method cannot be used to detect a large number of chip samples.

In view of the above, a light emitting apparatus is provided according to the present disclosure to solve the above problems in the conventional technologies. The light emitting apparatus includes a light source and an aperture limiting unit arranged in a light emitting path of the light source.

The light source is configured to emit light.

The aperture limiting unit includes a first stop module. The first stop module is configured to enter and leave the light emitting path of the light source, and limit an aperture of the light emitted by the light source when it is in the light emitting path of the light source, so as to block light at a large angle with a normal direction of an object to be detected.

An optical detection system is further provided according to the present disclosure. The optical detection system includes the light emitting apparatus described above and a receiving device.

Light emitted by the light emitting apparatus is reflected by the object to be detected.

The receiving device is configured to receive light reflected by the object to be detected and obtain structure information of the object to be detected based on the received light.

An optical detection method is further provided according to the present disclosure. The optical detection method includes:

emitting light by a light source, moving a first stop module in an aperture limiting unit into a light emitting path of the light source to limit an aperture of the light emitted by the light source, so as to block light at a large angle with a normal direction of an object to be detected.

With the optical detection system and the optical detection method according to the present disclosure, in a case that a current detection area of an object to be detected has a high aspect ratio structure, the first stop module in the aperture limiting unit enters the light emitting path of the light source to limit the aperture of the light emitted by the light source, so as to block light at a large angle with the normal direction of the object to be detected, such that the light is incident to the current detection area of the object to be detected along the normal direction of the object to be detected or along a direction at a small angle with the normal direction, thereby detecting the high aspect ratio structure in the current detection area effectively.

The above descriptions are core ideas of the present disclosure. In order to make the above objectives, features and advantages of the present disclosure obvious and easy to be understood, the technical solutions according to the embodiments of the present disclosure are clearly and completely described below in conjunction with the drawings of the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

A light emitting apparatus is provided according to the embodiments of the present disclosure. The light emitting apparatus may be applied to an optical detection system for detecting a three-dimensional surface contour of a chip or to an optical detection system for detecting information such as a film thickness of a chip, which is not limited in the present disclosure.

Figure 2:
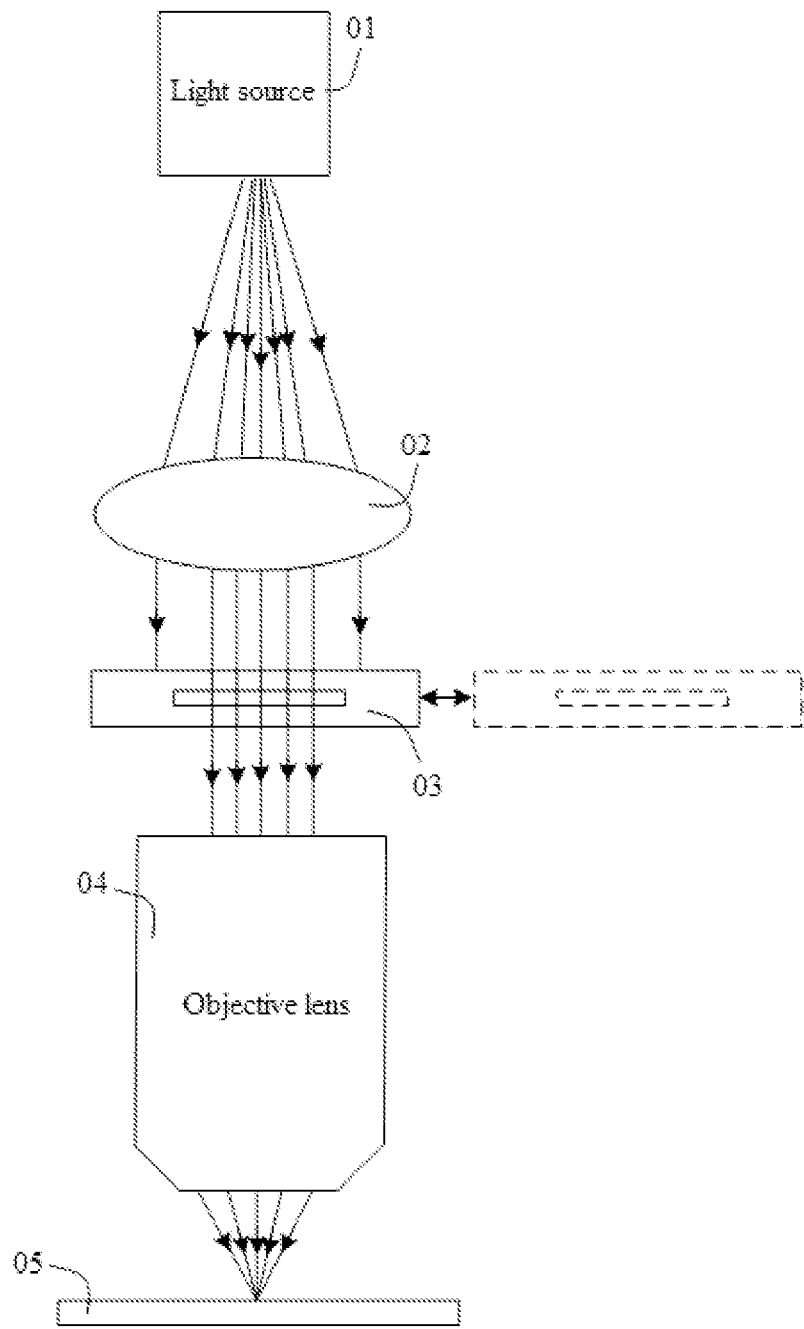
FIG. 2 is a schematic structural diagram of a light emitting apparatus according to an embodiment of the present disclosure.

In the embodiments of the present disclosure, as shown in FIG. 2, the light emitting apparatus includes a light source 01, a first lens group 02 and an aperture limiting unit 03 that are arranged in a light emitting path of the light source 01.

The light source 01 is configured to emit light. Optionally, the light source 01 is a white light source for emitting broad-spectrum light. The first lens group 02 is configured to perform beam expansion and shaping on the light emitted by the light source 01, which is not limited in the present disclosure. In other embodiments, beam expansion and shaping may not be performed by the first lens group 02.

Figure 3:
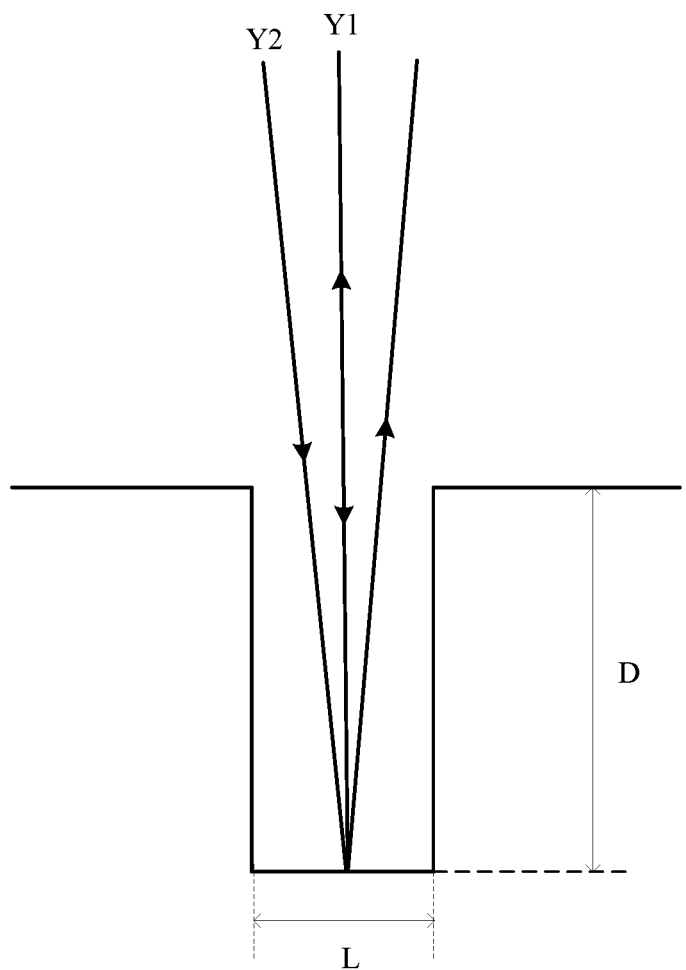
FIG. 3 is a schematic diagram of an optical path in detecting a high aspect ratio structure according to an embodiment of the present disclosure.

The aperture limiting unit 03 is configured to limit an aperture of the light emitted by the light source 01 in a case that a current detection area of an object 05 to be detected has a high aspect ratio structure, to block light at a large angle with a normal direction Y1 of the object 05 to be detected, such that the light is incident to a bottom of the high aspect ratio structure in the current detection area of the object 05 to be detected along the normal direction Y1 of the object 05 to be detected or a direction Y2 at a small angle with the normal direction Y1 of the object 05 to be detected as shown in FIG. 3, thereby detecting the high aspect ratio structure effectively.

Optionally, the aperture limiting unit 03 includes a first stop module and a control module.

In the embodiment, the control module is configured to control the first stop module to move downward to enter the light emitting path of the light source 01 in a case that the current detection area of the object 05 to be detected has a high aspect ratio structure, and control the first stop module to move upward to leave the light emitting path of light source 01 in a case that the current detection area of the object 05 to be detected does not have a high aspect ratio structure. In a case that the first stop module is in the light emitting path of the light source, the first stop module is configured to limit an aperture of the light emitted by the light source. It should be noted that in a case that the first stop module is out of the light emitting path of the light source 01, the control module does not have any effect on light in the light emitting path of the light source 01.

The light emitting apparatus in the embodiment further includes an objective lens 04. The objective lens 04 is configured to receive light from the first stop module or the light source 01 and project received light onto a surface of the object 05 to be detected. The first stop module limits a numerical aperture of objective lens 04 by limiting the aperture of the light emitted by the light source 01.

Figure 4:
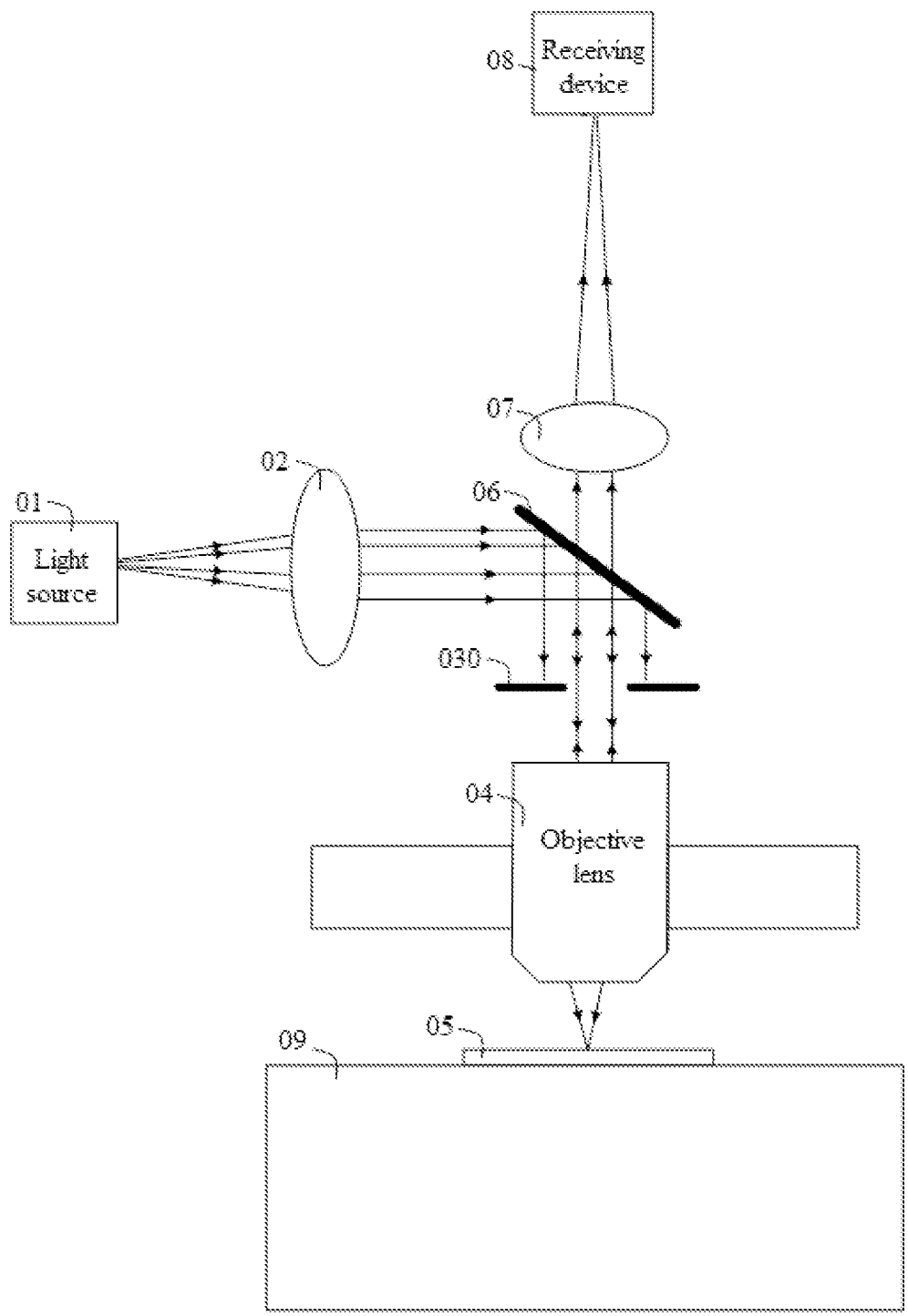
FIG. 4 is a schematic structural diagram of an optical detection system according to an embodiment of the present disclosure.

Optionally, as shown in FIG. 4, the first stop module in the embodiment includes a first stop 030. In a case that the first stop module is arranged in the light emitting path of the light source 01, the first stop 030 is at an entrance pupil of the objective lens 04, and a central axis of a through hole of the first stop 030 coincides with or approximately coincides with an optical axis of the objective lens 04.

In practice, the present disclosure is not limited to the above. In other embodiments, the first stop 030 may not be at the entrance pupil of the objective lens 04. In this case, a matching lens is required so that an image of the first stop 030 formed by the matching lens 031 is at the entrance pupil of the objective lens 04. That is, the first stop module in the embodiment may include the first stop 030, the matching lens 031 arranged at a side of the first stop 030 facing the objective lens 04, and a control module. In a case that the first stop module is arranged in the light emitting path of the light source 01, the matching lens 031 forms an image of the first stop 030 at the entrance pupil of the objective lens 04.

Based on the above, with the optical detection system according to the embodiments of the present disclosure, a high aspect ratio structure can be detected effectively without affecting a detection result and a detection speed of an area without a high aspect ratio structure. In addition, the optical detection system has the advantage of simple structure. It should be noted that the optical detection system according to the embodiments of the present disclosure can effectively detect a high aspect ratio structure in which a ratio of a depth to a width is greater than 20.

There is a through hole at the center of the first stop. Optionally, a diameter of the through hole ranges from 1 mm to 10 mm. In addition, shapes and sizes of the stop and the through hole may be set according to the actual needs and are not limited in the present disclosure.

The control module in the embodiment includes a controller and a first movable device. Optionally, the first movable device is a unidirectional electric movable platform with high precision.

The controller is configured to determine whether the current detection area has a high aspect ratio structure based on pre-stored structure data of the object 05 to be detected, send a first control instruction to the first movable device in a case that the current detection area has a high aspect ratio structure, to control the first movable device to drive the first stop module to enter the light emitting path of the light source 01, and send a second control instruction to the first movable device in a case that the current detection area does not have a high aspect ratio structure, to control the first movable device to drive the first stop module to leave the light emitting path of the light source 01.

Figure 5:
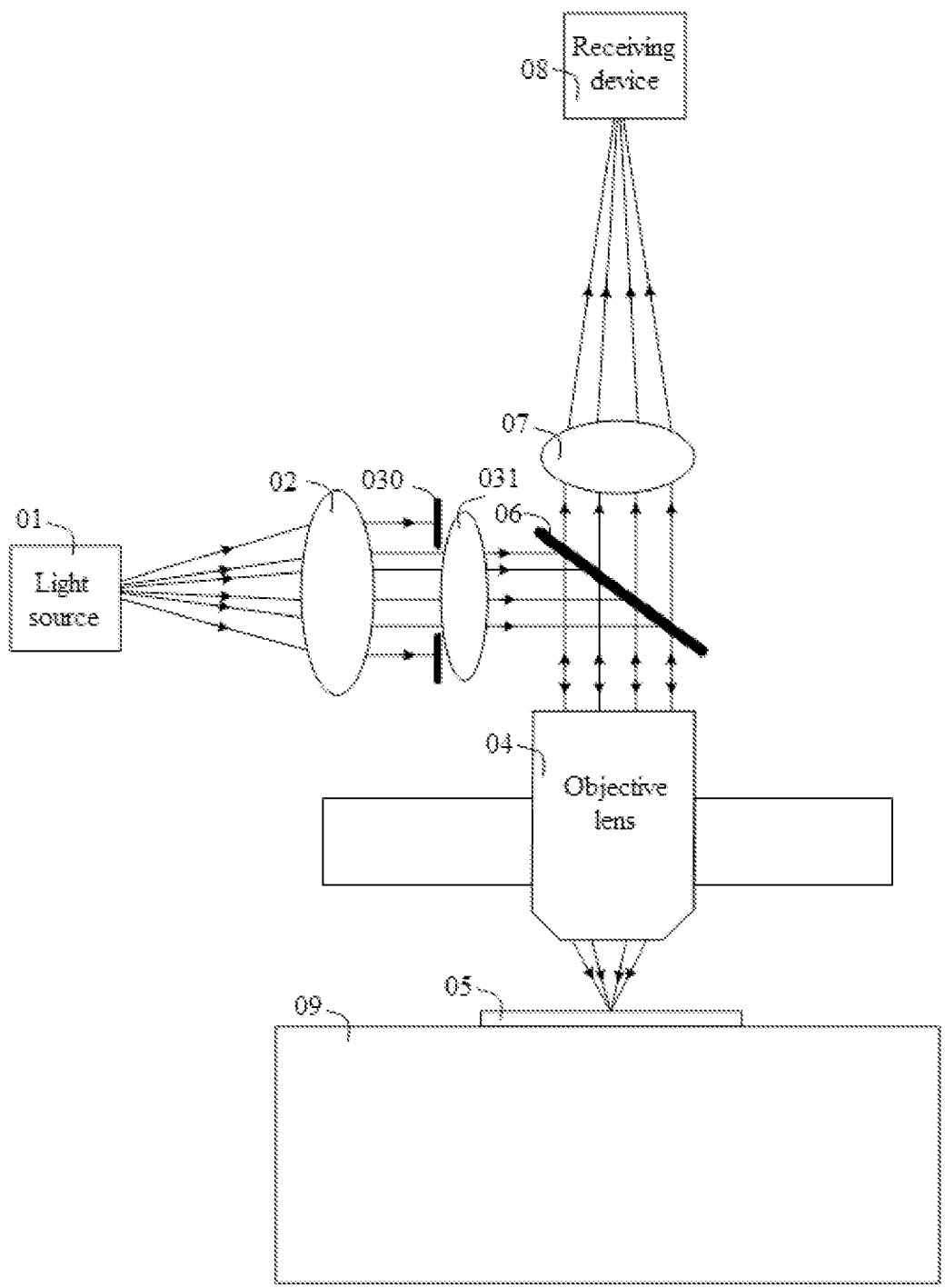
FIG. 5 is a schematic structural diagram of an optical detection system according to an embodiment of the present disclosure.

An optical detection system is further provided according to the embodiments of the present disclosure, as shown in FIG. 4 or FIG. 5. The optical detection system includes the light emitting apparatus described above and a receiving device 08. Light emitted by the light emitting apparatus is reflected by the object 05 to be detected. The receiving device 08 is configured to receive light reflected by the object 05 to be detected and obtain structure information of the object 05 to be detected based on received light.

The optical detection system in the embodiment further includes a beam splitter 06 and a second lens group 07. The beam splitter 06 is configured to reflect emergent light from the first lens group 02 or the aperture limiting unit 03. The objective lens 04 is configured to focus the emergent light from the first lens group 02 or the aperture limiting unit 03 on the object 05 to be detected and collect reflected light from the object 05 to be detected. The beam splitter 06 is further configured to transmit emergent light from the objective lens 04 to the second lens group 07. The second lens group 07 is configured to converge the emergent light from the objective lens 04 to the receiving device 08. The receiving device 8 is configured to obtain structure information of the object 5 to be detected based on received light. It should be noted that in the optical detection system shown in FIG. 4, the first stop 030 is arranged at the entrance pupil of the objective lens 04 and in the optical detection system shown in FIG. 5, the first stop 030 is not arranged at the entrance pupil of the objective lens 04.

A process of detecting by the optical detection system shown in FIG. 4 is described as follows. The light source 01 emits light. The first lens group 02 shapes the light emitted by the light source 01. Shaped light is incident on the beam splitter 06. The beam splitter 06 reflects the emergent light from the first lens group 02 to the first stop 030. The first stop 030 limits an aperture of the light emitted by the light source 01, that is, the first stop 030 limits an aperture of light entering the objective lens 04. The objective lens 04 focuses emergent light from the aperture limiting unit 03 on the object 05 to be detected, with emergent light therefrom being incident to a bottom of a high aspect ratio structure in the current detection area of the object 05 to be detected along the normal direction Y1 of the object 05 to be detected or along a direction Y2 at a small angle with the normal direction Y1 of the object 05 to be detected as shown in FIG. 3, thereby detecting the high aspect ratio structure effectively. Then, the objective lens 04 collects reflected light from the object 05 to be detected and transmits the reflected light to the beam splitter 06. The beam splitter 06 transmits emergent light from the objective lens 04 to the second lens group 07. The second lens group 07 converges the emergent light from the objective lens 04 to the receiving device 08. The receiving device 08 obtains structure information of the object 05 to be detected based on received emergent light.

Differences between a process of detecting by the optical detection system shown in FIG. 5 and the process of detecting by the optical detection system shown in FIG. 4 are described as following. In the process of detecting by the optical detection system shown in FIG. 5, emergent light from the first lens group 02 passes through the first stop 030 and the matching lens 031 first. After the first stop 030 limits the aperture of the light, the matching lens 031 causes an image formed by light passing through the first stop 030 to be at the entrance pupil of the objective lens 04, that is, emergent light from the matching lens 031 forms an image at the entrance pupil of the objective lens 04 after reflected by the beam splitter 06. Then, the objective lens 04 focuses emergent light from the aperture limiting unit 03 on the object 05 to be detected, with emergent light therefrom being incident to a bottom of the high aspect ratio structure in the current detection area of the object 05 to be detected along the normal direction Y1 of the object 05 to be detected or along the direction Y2 at a small angle with the normal direction Y1 of the object 05 to be detected as shown in FIG. 3, thereby detecting the high aspect ratio structure effectively.

In an embodiment of the present disclosure, the optical detection system is an optical detection system for detecting a three-dimensional surface contour of a chip with white light interferometry. As shown in FIG. 4 or FIG. 5, the objective lens 04 in the optical detection system is an interference objective lens and the receiving device 08 is a photoelectric detector. In addition, the optical detection system further includes a second movable device 09. The second movable device 09 is preferably an electric movable platform with high precision. Each of the first lens group 02 and the second lens group 07 includes at least one lens.

After collecting the reflected light from the object 05 to be detected, the interference objective lens 04 causes the reflected light to interfere with reference light, and transmits interference light to the beam splitter 06. The second movable device 09 is configured to drive the objective lens 04 or the object 05 to be detected to move along a direction perpendicular to the object 05 to be detected. The photoelectric detector is configured to reconstruct a three-dimensional surface contour of the object 05 to be detected based on received interference light.

It should be noted that in detection, the second movable device 09 drives the objective lens 04 or the object 05 to be detected to move upward and downward along the direction perpendicular to the object 05 to be detected. An interference pattern obtained by the photoelectric detector fluctuates with a variation in height in the detection. A brightness peak value of interference fringes corresponds to a relative height of a detection position, so that a height distribution of required detection areas can be obtained by comparing relative heights of different positions. Though a position of the entrance pupil changes as the objective lens 04 moves upward and downward along the direction perpendicular to the object 05 to be detected, the entrance pupil is barely influenced because a scanning range of the objective lens 04 is small (less than 5 mm). Therefore, positions of the first stop and the matching lens will not change accordingly in the detection.

In addition, the second movable device 09 may be an electric movable platform arranged under the object 05 to be detected. The electric movable platform can drive the object 05 to be detected to move not only upward and downward but also along a direction parallel to the object 05 to be detected, for example, to move left and right, to cause incident light to be radiate on various areas of the object 05 to be detected, so as to obtain three-dimensional surface contour information of various areas of the object 05 to be detected.

Figure 6:
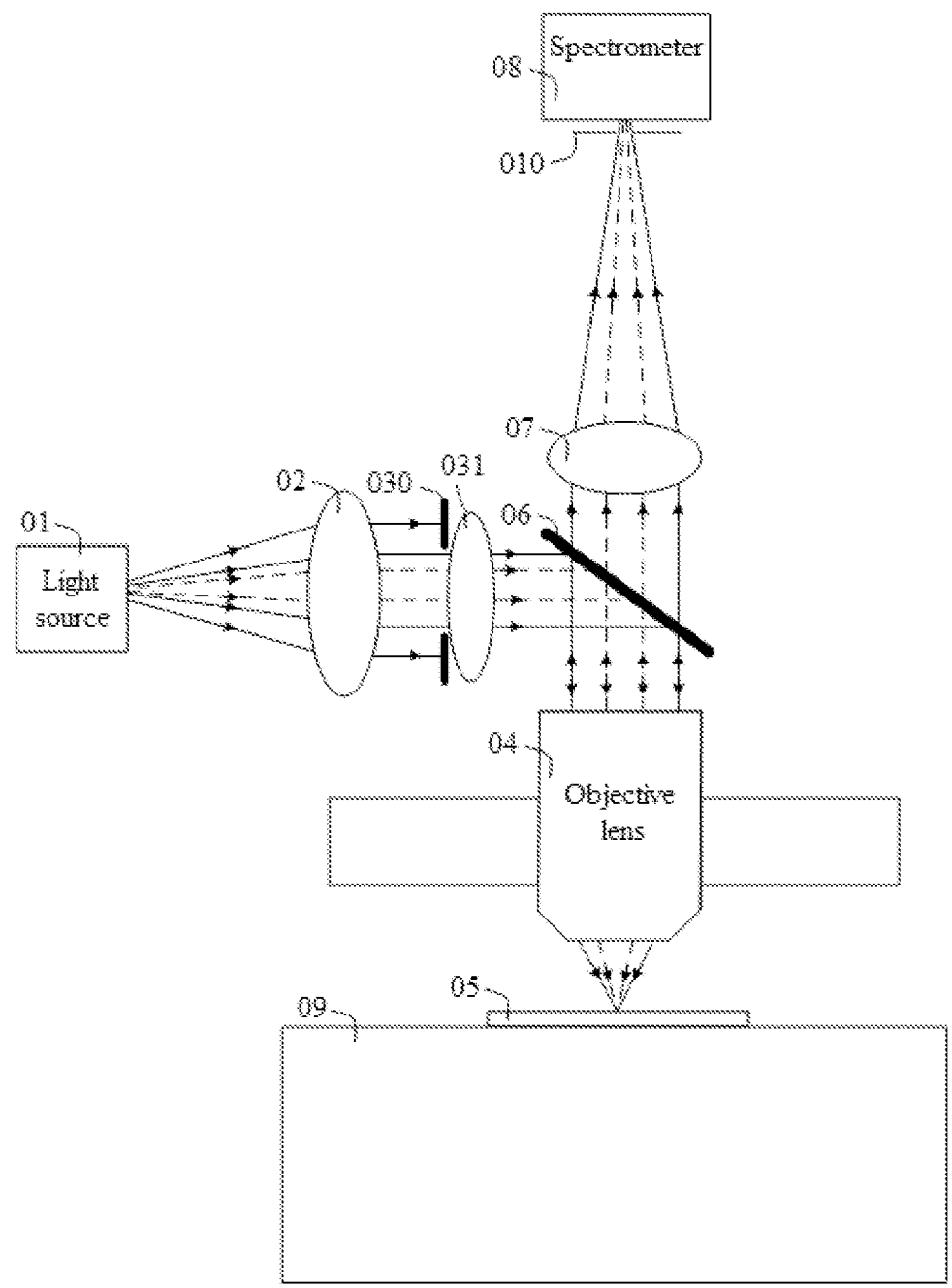
FIG. 6 is a schematic structural diagram of an optical detection system according to an embodiment of the present disclosure.

In another embodiment of the present disclosure, the optical detection system is an optical detection system for detecting a film thickness of a chip with reflectance spectroscopy. As shown in FIG. 6, the receiving device 08 is a spectrometer. A second stop 010 is arranged at a light inlet of the spectrometer. The second stop 010 is configured to limit an aperture of emergent light entering the spectrometer. The spectrometer is configured to obtain film thickness information of the object 05 to be detected based on the emergent light.

It should be noted that the optical detection system further includes an electric movable platform 09 under the object 05 to be detected. The electric movable platform 09 can drive the object 05 to be detected to move along a direction parallel to the object 05 to be detected to cause incident light to radiate on various areas of the object 05 to be detected, so as to obtain film thickness information of various areas of the object 05 to be detected.

With the optical detection system according to the present disclosure, in a case that the current detection area of the object to be detected has a high aspect ratio structure, the aperture limiting unit limits an aperture of light entering the objective lens to limit a numerical aperture of the objective lens, so as to cause emergent light from the objective lens to be incident to the current detection area of the object to be detected along the direction perpendicular to the object to be detected or along a direction at a small angle with the direction perpendicular to the object to be detected, thereby detecting the high aspect ratio structure in the current detection area effectively.

Figure 7:
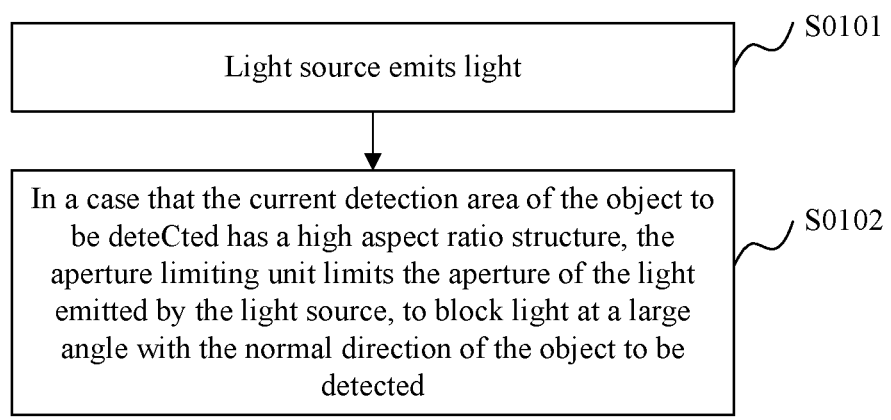
FIG. 7 is a flowchart of an optical detection method according to an embodiment of the present disclosure.

An optical detection method is further provided according to the embodiments of the present disclosure. The optical detection method is applied to the optical detection system according to any one of the embodiments described above. As shown in FIG. 7, the optical detection method includes the following steps S0101 and S0102.

In step S0101, the light source emits light.

In step S0102, in a case that the current detection area of the object to be detected has a high aspect ratio structure, the aperture limiting unit limits the aperture of the light emitted by the light source to block light at a large angle with the normal direction of the object to be detected.

In the embodiment, the aperture limiting unit includes a first stop module and a control module. The optical detection method according to the present disclosure further includes:

controlling, by the control module in a case that the current detection area of the object to be detected has a high aspect ratio structure, the first stop module to enter the light emitting path of the light source, and controlling, by the control module in a case that the current detection area of the object to be detected does not have a high aspect ratio structure, the first stop module to leave the light emitting path of the light source.

Preferably, the light emitting apparatus includes an objective lens. In a case that the first stop module includes a first stop, the step of controlling the first stop module to enter the light emitting path of the light source includes: arranging the first stop at the entrance pupil of the objective lens.

In a case that the first stop module includes the first stop and a matching lens, the step of controlling the first stop module to enter the light emitting path of the light source includes: rendering an image of the first stop formed by the matching lens at the entrance pupil of the objective lens.

Further, the control module includes a controller and a first movable device, and the optical detection method according to the present disclosure further includes:

determining, by the controller based on pre-stored structure data of the object to be detected, whether the current detection area has a high aspect ratio structure, sending, by the controller in a case that the current detection area has a high aspect ratio structure, a first control instruction to the first movable device, to control the first movable device to drive the first stop to enter the light emitting path of the light source or drive the first stop and the matching lens to enter the light emitting path of the light source, and sending, by the controller in a case that the current detection area does not have a high aspect ratio structure, a second control instruction to the first movable device to control the first movable device to drive the first stop to leave the light emitting path of the light source or drive the first stop and the matching lens to leave the light emitting path of the light source.

The optical detection system according to the preset disclosure further includes a first lens group, a beam splitter, a second lens group, and a receiving device. Based on this, after the light source emits light, the optical detection method further includes: performing, by the first lens group, beam expansion and shaping on the light emitted by the light source.

In addition, the optical detection method according to the embodiment further includes:

reflecting, by the beam splitter, emergent light from the first lens group or emergent light from the aperture limiting unit, focusing, by the objective lens, emergent light from the aperture limiting unit on the object to be detected, and collecting, by the objective lens, reflected light from the object to be detected, transmitting, by the beam splitter, emergent light from the objective lens to the second lens group, converging, by the second lens group, the emergent light from the objective lens to the receiving device, and obtaining, by the receiving device based on the received emergent light, structure information of the object to be detected.

A process of detecting by the optical detection system shown in FIG. 4 is described as follows. The light source 01 emits light. The first lens group 02 shapes the light emitted by the light source 01. Shaped light is incident on the beam splitter 06. The beam splitter 06 reflects the emergent light from the first lens group 02 to the first stop 030. The first stop 030 limits an aperture of light entering the objective lens 04. The objective lens 04 focuses emergent light from the aperture limiting unit 03 on the object 05 to be detected, with emergent light therefrom being incident to a bottom of a high aspect ratio structure in the current detection area of the object 05 to be detected along the normal direction Y1 of the object 05 to be detected or along a direction Y2 at a small angle with the normal direction Y1 of the object 05 to be detected as shown in FIG. 3, thereby detecting the high aspect ratio structure effectively. Then, the objective lens 04 collects reflected light from the object 05 to be detected and transmits the reflected light to the beam splitter 06. The beam splitter 06 transmits emergent light from the objective lens 04 to the second lens group 07. The second lens group 07 converges the emergent light from the objective lens 04 to the receiving device 08. The receiving device 08 obtains structure information of the object 05 to be detected based on received emergent light.

Differences between a process of detecting by the optical detection system shown in FIG. 5 and the process of detecting by the optical detection system shown in FIG. 4 are described as following. In the process of detecting by the optical detection system shown in FIG. 5, emergent light from the first lens group 02 passes through the first stop 030 and the matching lens 031 first. After the first stop 030 limits the aperture of the light, the matching lens 031 causes an image formed by light passing through the first stop 030 to be at the entrance pupil of the objective lens 04, that is, emergent light from the matching lens forms an image at the entrance pupil of the objective lens 04 after reflected by the beam splitter 06. Then, the objective lens 04 focuses emergent light from the aperture limiting unit 03 on the object 05 to be detected, with emergent light therefrom being incident to a bottom of the high aspect ratio structure in the current detection area of the object 05 to be detected along the normal direction Y1 of the object 05 to be detected or along the direction Y2 at a small angle with the normal direction Y1 of the object 05 to be detected as shown in FIG. 3, thereby detecting the high aspect ratio structure effectively.

In an embodiment of the present disclosure, the optical detection system is an optical detection system for detecting a three-dimensional surface contour of a chip with white light interferometry. As shown in FIG. 4 or FIG. 5, the objective lens 04 in the optical detection system is an interference objective lens and the receiving device 08 is a photoelectric detector. In addition, the optical detection system further includes a second movable device 09. The second movable device 09 is preferably an electric movable platform with high precision. Each of the first lens group 02 and the second lens group 07 includes at least one lens.

After collecting the reflected light from the object 05 to be detected, the interference objective lens 04 causes the reflected light to interfere with reference light, and transmits interference light to the beam splitter 06. The second movable device 09 is configured to drive the objective lens 04 or the object 05 to be detected to move along a direction perpendicular to the object 05 to be detected. The photoelectric detector is configured to reconstruct a three-dimensional surface contour of the object 05 to be detected based on received interference light.

It should be noted that in detection, the second movable device 09 drives the objective lens 04 or the object 05 to be detected to move upward and downward along the direction perpendicular to the object 05 to be detected. An interference pattern obtained by the photoelectric detector fluctuates with a variation in height in the detection. A brightness peak value of interference fringes corresponds to a relative height of a detection position, so that a height distribution of required detection areas can be obtained by comparing relative heights of different positions.

In addition, the second movable device 09 may be an electric movable platform arranged under the object 05 to be detected. The electric movable platform can drive the object 05 to be detected to move not only upward and downward but also along a direction parallel to the object 05 to be detected, for example, to move left and right, to cause incident light to be radiate on various areas of the object 05 to be detected, so as to obtain three-dimensional surface contour information of various areas of the object 05 to be detected.

In another embodiment of the present disclosure, the optical detection system is an optical detection system for detecting a film thickness of a chip with reflectance spectroscopy. As shown in FIG. 6, the receiving device 08 is a spectrometer. A second stop 010 is arranged at a light inlet of the spectrometer. The second stop 010 is configured to limit an aperture of emergent light entering the spectrometer. The spectrometer is configured to obtain film thickness information of the object 05 to be detected based on the emergent light.

It should be noted that the optical detection system further includes an electric movable platform 09 under the object 05 to be detected. The electric movable platform 09 can drive the object 05 to be detected to move along a direction parallel to the object 05 to be detected to cause incident light to radiate on various areas of the object 05 to be detected, so as to obtain film thickness information of various areas of the object 05 to be detected.

With the optical detection method according to the present disclosure, in a case that the current detection area of the object to be detected has a high aspect ratio structure, the aperture limiting unit limits an aperture of light emitted by the light source, to block light at a large angle with the normal direction of the object to be detected, such that the light is incident to the current detection area of the object to be detected along the normal direction of the object to be detected or along a direction at a small angle with the normal direction, thereby detecting the high aspect ratio structure in the current detection area effectively.

An optical detection apparatus is provided according to the embodiments of the present disclosure. The optical detection device may be applied to detecting image information and structure information of a chip. The structure information includes three-dimensional coordinate information and film thickness information.

Figure 8:
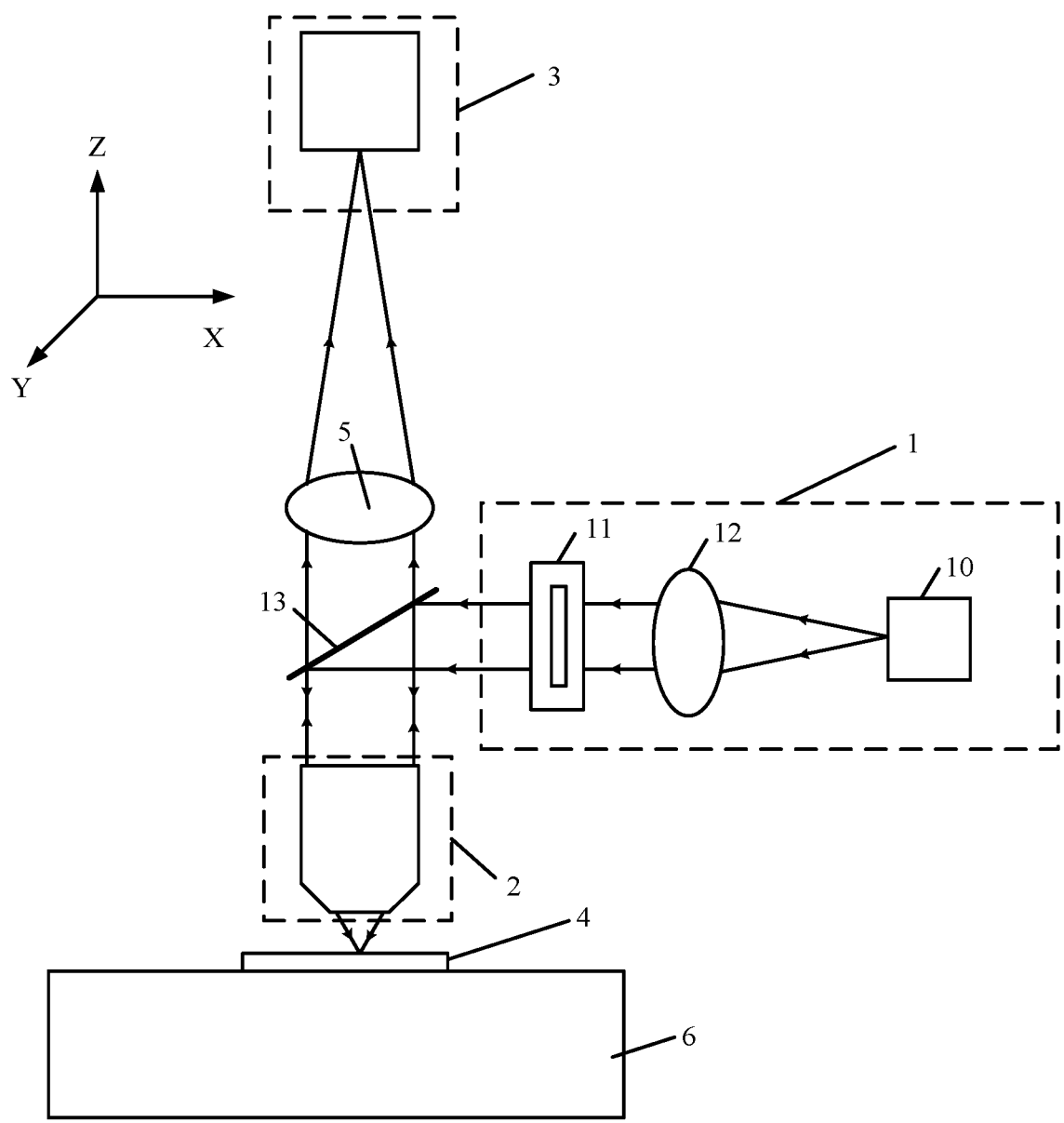
FIG. 8 is a schematic structural diagram of an optical detection apparatus according to an embodiment of the present disclosure.

As shown in FIG. 8, the optical detection device includes a light source module 1, a projecting unit 2 and a receiving unit 3. The light source module 1 includes a light source 10 and an aperture limiting module 11.

In the present disclosure, the light source 10 is configured to emit detection light. The projecting unit 2 includes at least one projecting device. The projecting device is configured to project the detection light emitted by the light source module 1 to a surface of an object 4 to be detected, collect reflected light from the object 4 to be detected, and emit detection signal light. The receiving unit 3 is configured to receive the detection signal light and obtain image information and structure information of the object 4 to be detected based on the detection signal light.

The aperture limiting module 11 is configured to enter and leave a light emitting path of the light source 10, and limit an aperture of the detection light emitted by the light source 10 when the aperture limiting module 11 is in the light emitting path of the light source 10, to block light at a large angle with a normal direction of the object 4 to be detected, so as to cause the light to be incident to a bottom of a specific detection structure, such as a high aspect ratio structure, in a current detection area of the object 4 to be detected along the normal direction Y1 of the object 4 to be detected or along a direction Y2 at a small angle with the normal direction Y1 of the object 4 to be detected as shown in FIG. 3, thereby detecting the specific detection structure, such as a high aspect ratio structure, effectively.

In addition, in the optical detection apparatus according to the present disclosure, a first lens group 12 may be arranged between the light source 10 and the aperture limiting module 11. The first lens group 12 is configured to perform beam expansion and shaping on the detection light emitted by the light source 10. A first splitter 13 is arranged between the light source module 1 and the projecting unit 2, and is configured to reflect the detection light emitted by the light source module 1 to the projecting device in the projecting unit 2, and transmit a detection light signal emitted by the projecting device to the receiving unit 3. A second lens group 5 is arranged between the first splitter 13 and the receiving unit 3. The second lens group 5 is configured to converge the detection light signal transmitted by the first splitter 13 to the receiving device in the receiving unit 3. A carrying platform 6 is arranged under the object 4 to be detected. The carrying platform 6 is an electric movable platform and can drive the object 4 to be detected to move along X axis, Y axis and Z axis.

Optionally, the optical detection apparatus in the embodiment further includes a first movable device. The first movable device is configured to control the aperture limiting module 11 to enter and leave the light emitting path of the light source 10.

The optical detection device in the embodiment further includes a controller. The controller is configured to determine, based on image information of the object 4 to be detected pre-obtained by the receiving unit 3, whether an area to be detected has a specific detection structure such as a high aspect ratio structure, and send, in a case that the current detection area has the specific detection structure, a first control instruction to the first movable device, to control the first movable device to drive the aperture limiting module to enter the light emitting path of the light source 10. In practice, the present disclosure is not limited to the above. In other embodiments, the controller may further determine whether an area to be detected of the object 4 to be detected has a specific detection structure such as a high aspect ratio structure based on pre-stored structure data of the object 4 to be detected. The specific detection structure in the embodiments of the present disclosure includes but is not limited to a high aspect ratio structure.

Optionally, the projecting device in the projecting unit 2 is an objective lens. The aperture limiting module 11 includes a first stop. In a case that the aperture limiting module 11 is in the light emitting path of the light source 10, the first stop is at an entrance pupil of the objective lens. Alternatively, the aperture limiting module 11 includes the first stop and a matching lens. In a case that the aperture limiting module 11 is in the light emitting path of the light source 10, the matching lens forms an image of the first stop at the entrance pupil of the objective lens.

Optionally, the aperture limiting module 11 includes a first stop. In a case that aperture limiting module 11 is in the light emitting path of the light source 10, the first stop is at the entrance pupil of the objective lens, and a central axis of a through hole thereof coincides with or approximately coincides with an optical axis of the objective lens.

In practice, the present disclosure is not limited to the above. In other embodiments, the first stop may not be arranged at the entrance pupil of the objective lens. In this case, a matching lens is required so that an image of the first stop formed by the matching lens is located at the entrance pupil of the objective lens. That is, the aperture limiting module 11 in the embodiment may include the first stop, the matching lens arranged at a side of the first stop facing the objective lens, and a control module. In a case that the aperture limiting module 11 is in the light emitting path of the light source, the matching lens forms an image of the first stop at the entrance pupil of the objective lens.

There is a through hole at the center of the first stop. Optionally, a diameter of the through hole ranges from 1 mm to 10 mm. In addition, shapes and sizes of the stop and the through hole may be set according to the actual needs and are not limited in the present disclosure.

In an embodiment of the present disclosure, referring to FIG. 8, the aperture limiting module 11 is removed from the light emitting path of the light source 10 first. Then the carrying platform 6 drives the object 4 to be detected to move to find an area to be detected of the object 4 to be detected. Then the light source 10 emits detection light. The projecting device in the projecting unit 2 projects the detection light emitted by the light source 10 to the area to be detected of the object 4 to be detected, collects reflected light from the object 4 to be detected, and emits detection signal light. The receiving unit 3 obtains image information of the object 4 to be detected based on the detection signal light. The image information includes transverse dimension information of a key structure, such as photoresist and a metal layer, in the area to be detected of the object 4 to be detected.

Then, the controller of the aperture limiting module 11 determines whether the area to be detected of the object 4 to be detected has a specific detection structure such as a high aspect ratio structure based on the image information, controls the aperture limiting module 11 to enter the light emitting path of the light source 10 in a case that the area to be detected has a specific detection structure such as a high aspect ratio structure, to limit an aperture of the detection light emitted by the light source 10, and controls the aperture limiting module 11 not to enter the light emitting path of the light source 10 in a case that the area to be detected does not have a specific detection structure such as a high aspect ratio structure.

Then, the projecting device in the projecting unit 2 projects the detection light from the light source 10 or from the aperture limiting module 11 to a surface of the object 4 to be detected, collects reflected light from the object 4 to be detected, and emits detection signal light. The receiving unit 3 obtains structure information of the object 4 to be detected based on the detection signal light. The structure information includes three-dimensional coordinate information and film thickness information.

In the embodiment, the number of the area to be detected is more than one, and adjacent areas to be detected are in contact with each other or are not in contact with each other.

The above steps are repeated until detections for all areas of the object 4 to be detected are completed.

Based on the above, the optical detection apparatus according to the embodiments of the present disclosure can not only obtain the structure information of the object 4 to be detected through the light source 10, the projecting unit 2 and the receiving unit 3, but also effectively detect a special detection structure such as a high aspect ratio structure in an area to be detected of the object 4 to be detected through the light source 10, the aperture limiting module 11, the projecting unit 2 and the receiving unit 3 without affecting a detection result and a detection speed of an area without a specific detection structure such as a high aspect ratio structure. In addition, the optical detection apparatus has the advantage of simple structure. It should be noted that the optical detection apparatus according to the embodiments of the present disclosure can effectively detect a high aspect ratio structure in which a ratio of a depth to a width is greater than 20.

In an embodiment of the present disclosure, the projecting unit 2 includes at least two projecting devices and a switching device 20. The switching device 20 is configured to switch between projecting devices in the light emitting path of the light source module 1, that is, to switch a corresponding projecting device into the light emitting path of light source module 1. Different projecting devices emit different detection signal light. Optionally, the switching device 20 is an objective lens switch.

Figure 9:
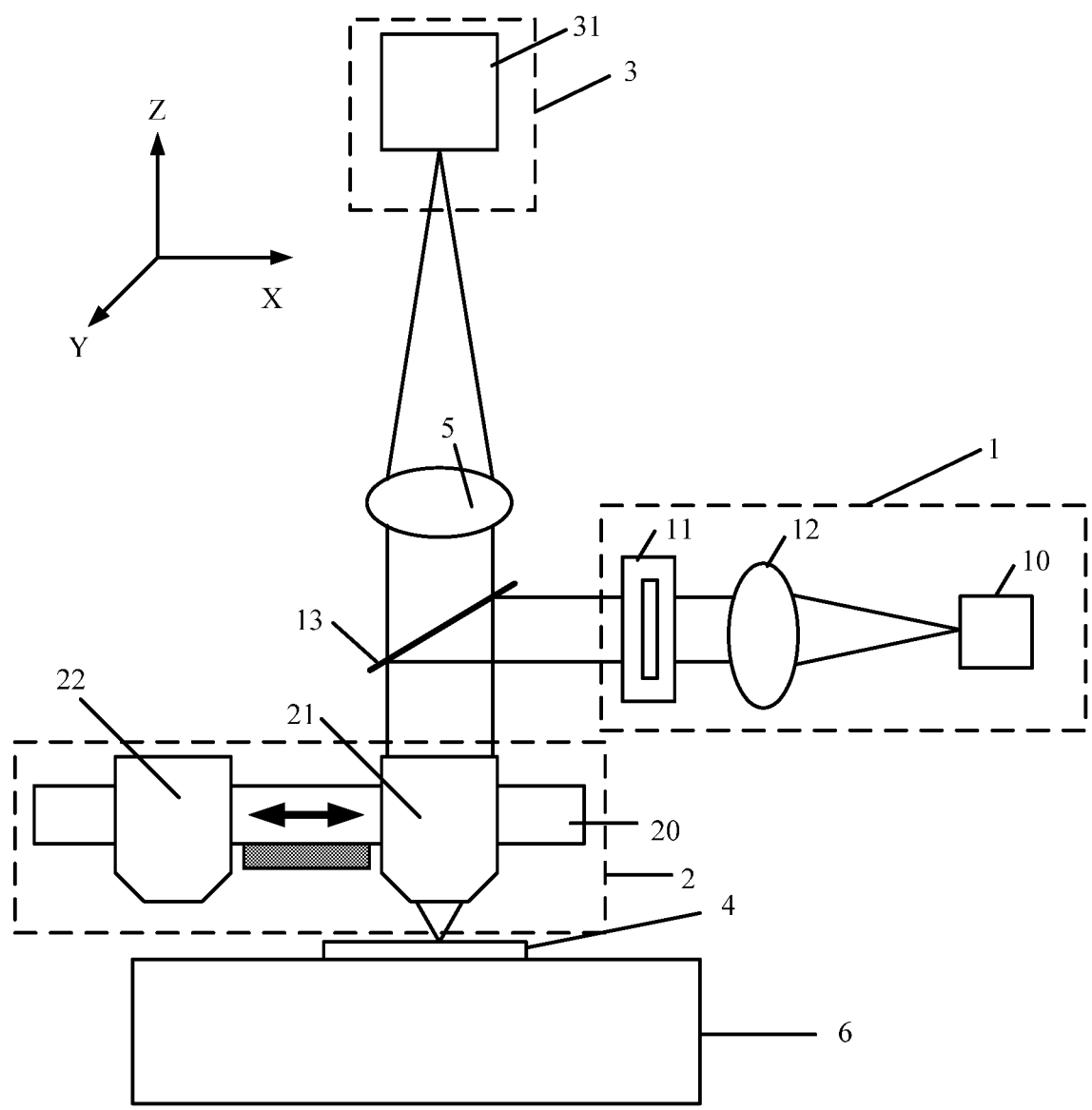
FIG. 9 is a schematic structural diagram of an optical detection apparatus according to an embodiment of the present disclosure.

As shown in FIG. 9, the at least two projecting devices include a first projecting device 21 and a second projecting device 22. The first projecting device 21 is configured to project part of the detection light emitted by the light source module 1 to the surface of the object 4 to be detected, transform part of the detection light into reference light, collect reflected light formed by the object 4 to be detected reflecting the detection light, cause the reflected light to interfere with the reference light, and transmit interference light to the receiving unit 3. The interference light is detection signal light emitted by the first projecting device 21. The reference light is part of detection signal light incident on the first projecting device 21. The second projecting device 22 is configured to project the detection light emitted by the light source module 1 to the surface of the object 4 to be detected, collect reflected light from the object 4 to be detected, and transmit the reflected light to the receiving unit 3. The reflected light is detection signal light emitted by the second projecting device 22.

Based on the above, the structure information includes three-dimensional coordinate information of the object to be detected. The receiving unit 3 at least includes a first receiving device 31. The first receiving device 31 generates the three-dimensional coordinate information of the object to be detected based on the detection signal light emitted by the first projecting device 21 and generates image information of the object to be detected based on the detection signal light emitted by the second projecting device 22.

The second projecting device 22 is an imaging objective lens. The first projecting device 21 is an interference objective lens. The first receiving device 31 is an image sensor such as a CCD image sensor or a CMOS image sensor.

Figure 10:
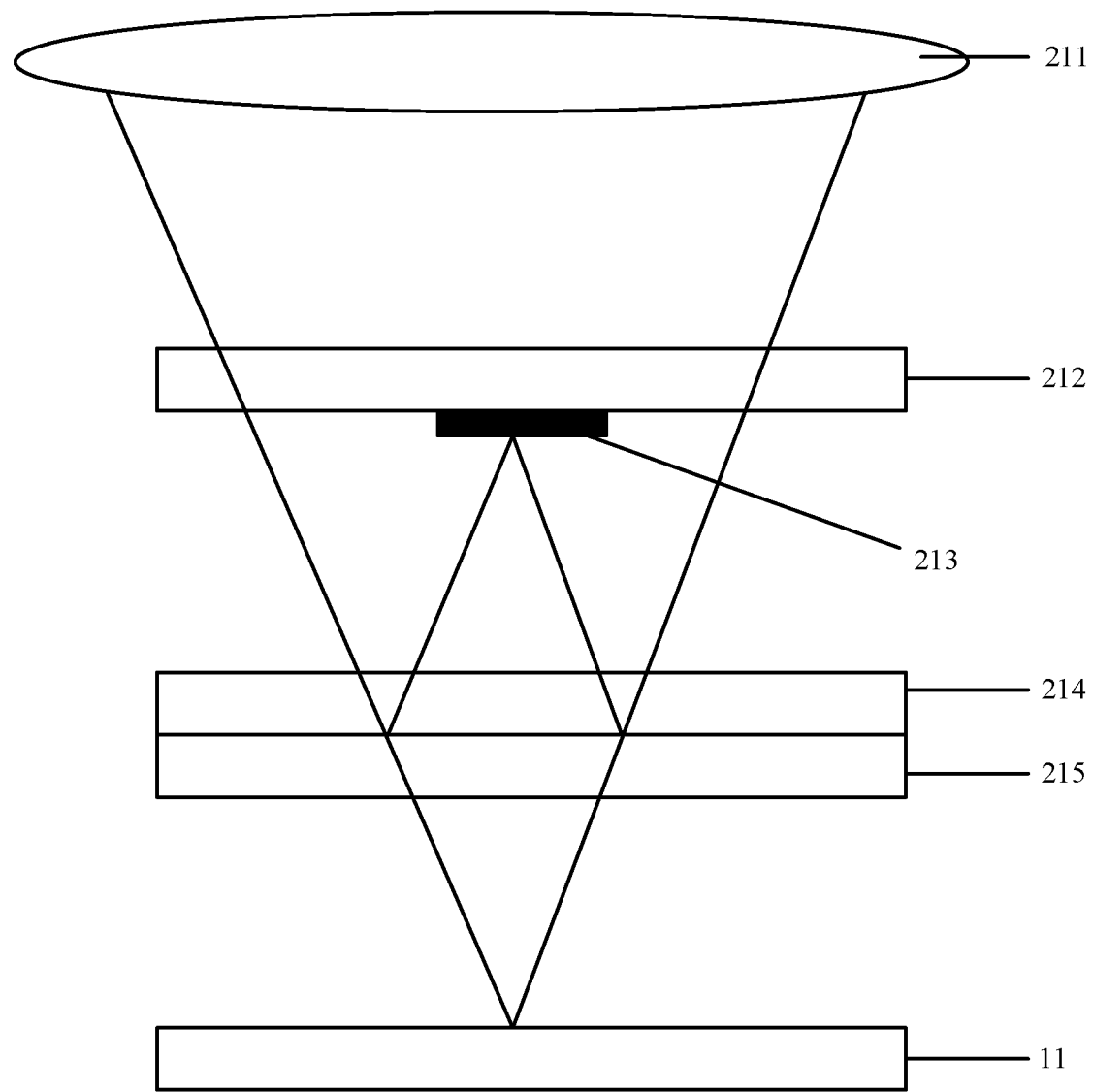
FIG. 10 is a schematic structural diagram of a first projecting device according to an embodiment of the present disclosure.

As shown in FIG. 10, the interference objective lens includes a converging lens 211, a support plate 212, a reference plate 213, a compensation plate 214 and a first beam splitter plate 215 that are arranged in the optical path sequentially. The converging lens 211 is configured to converge the detection light on the support plate 212. The detection light reaches the first beam splitter plate 215 after transmitted by the support plate 212 and the compensation plate 214. Light reflected by the first beam splitter plate 215 is reference light. Light transmitted by the first beam splitter plate 215 is detection light incident to the object 4 to be detected. The reference light is reflected by the reference plate 213 and the first beam splitter plate 215 sequentially after transmitted by the compensation plate 214 and form interference light together with the reflected light formed by reflection of the object 4 to be detected. The compensation plate 214 is configured to perform phase compensation on the reference light and the detection light to cause the reference light and the detection light to meet an interference condition.

It should be noted that the interference objective lens generally includes a converging lens and an interference head that is arranged between the converging lens and the object 4 to be detected. A structure of the interference head is similar to or the same as structure of the support plate 212, the compensation plate 214 and the first beam splitter plate 215 shown in FIG. 10. A structure and an implementation of the first projecting device 21 are not limited in the present disclosure and may be determined according to actual conditions.

In the optical detection apparatus shown in FIG. 9, the aperture limiting module 11 is removed from the light emitting path of the light source 10 first. The switching device 20 switches the second projecting device 22 into the light emitting path of the light source 10. Then the carrying platform 6 drives the object 4 to be detected to move to find an area to be detected of the object 4 to be detected. Then the light source emits detection light. The second projecting device 22 projects the detection light emitted by the light source 10 to the area to be detected of the object 4 to be detected, collects reflected light from the object 4 to be detected, and transmits the reflected light. The first receiving device 31 obtains image information of the object 4 to be detected based on the reflected light. The image information includes position and transverse dimension information of a structure to be detected in the area to be detected of the object 4 to be detected. The structure to be detected includes one or more of photoresist, a metal layer and a silicon through hole.

Then, the controller of the aperture limiting module 11 determines whether the area to be detected of the object 4 to be detected has a specific detection structure such as a high aspect ratio structure based on the image information, controls the aperture limiting module 11 to enter the light emitting path of the light source 10 in a case that the area to be detected has a specific detection structure such as a high aspect ratio structure, to limit an aperture of the detection light emitted by the light source 10, obtains structure information of the specific detection structure after limiting the aperture of the detection light emitted by the light source 10, and controls the aperture limiting module 11 not to enter the light emitting path of the light source 10 in a case that the area to be detected does not have the specific detection structure such as a high aspect ratio structure or in a case that a structure other than the specific detection structure in the area to be detected is under detection.

Then, the switching device 20 switches the first projecting device 21 into the light emitting path of the light source 10. The first projecting device 21 projects the detection light from the light source 10 or the aperture limiting module 11 to the surface of the object 4 to be detected, collects reflected light from the object 4 to be detected, causes the reflected light to interfere with the reference light, and transmits interference light to the first receiving device 31. The first receiving device 31 obtains three-dimensional coordinate information of the object 4 to be detected based on the interference light.

The above steps are repeated until detections for all areas of the object 4 to be detected are completed.

It should be noted that in detecting the three-dimensional coordinate information of the object 4 to be detected, a distance between the object 4 to be detected and the first projecting device 21 is required to be changed constantly to obtain interference fringes that changes constantly based on obtained interference information. An interference pattern obtained by the first receiving device 31 fluctuates with a change in the distance during detection. A brightness peak value of the interference fringes corresponds to a relative height of a detection position. Therefore, a required height distribution of detection areas can be obtained by comparing relative heights of different positions.

Figure 11:
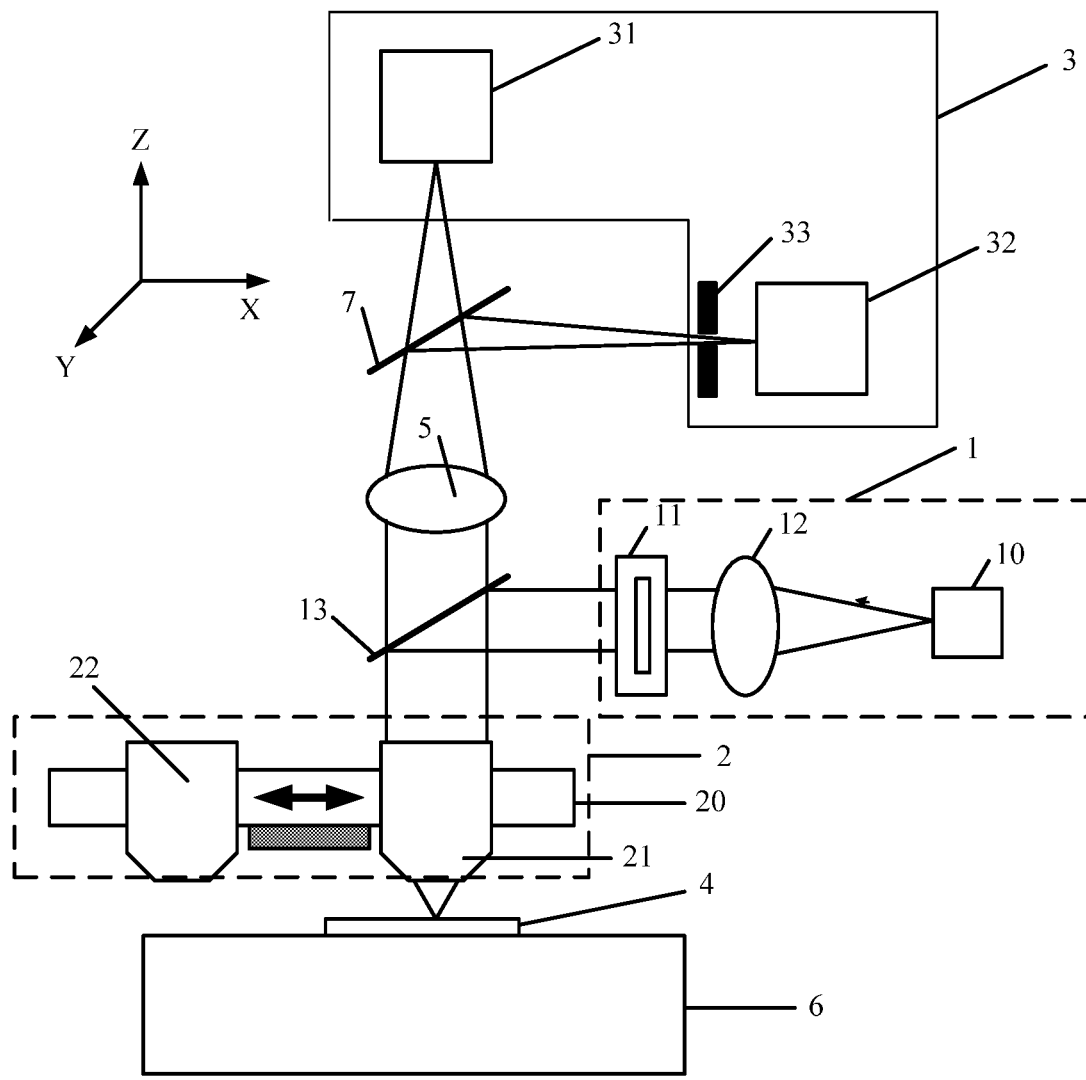
FIG. 11 is a schematic structural diagram of an optical detection apparatus according to an embodiment of the present disclosure.

Based on the above, as shown in FIG. 11, the structure information further includes film thickness information of the area to be detected. The receiving unit 3 further includes a second receiving device 32. The second receiving device 32 obtains the film thickness information of the surface of the object 4 to be detected based on the detection signal light from the second projecting device 22. Optionally, the second projecting device 22 is a spectrometer. A second stop 33 is arranged at a light inlet of the spectrometer. The second stop 33 is configured to limit an aperture of emergent light entering the spectrometer.

In the apparatus shown in FIG. 11, after the image information of the object 4 to be detected is obtained, the aperture limiting module 11 determines whether the area to be detected of the object 4 to be detected has a specific detection structure such as a high aspect ratio structure based on the image information. Then, the second projecting device 22 projects the detection light from the light source 10 or the aperture limiting module to the surface of the object 4 to be detected, collects reflected light from the object 4 to be detected, and transmits the reflected light to the second receiving device 32. The second receiving device 32 obtains film thickness information of the object 4 to be detected based on the reflected light.

Then, the switching device 20 switches the first projecting device 21 into the light emitting path of the light source 10. The first projecting device 21 projects the detection light from the light source 10 or the aperture limiting module 11 to the surface of the object 4 to be detected, collects reflected light from the object 4 to be detected, causes the reflected light to interfere with the reference light, and transmits interference light to the first receiving device 31. The first receiving device 31 obtains three-dimensional coordinate information of the object 4 to be detected based on the interference light.

The above steps are repeated until surface film thickness information and three-dimensional coordinate information of all areas to be detected of the object 4 to be detected are obtained.

In the embodiment, the image information is obtained through the second projecting device 22 and the first receiving device 31, that is, the image information of the object to be detected is obtained through the imaging lens and the image sensor.

Figure 12:
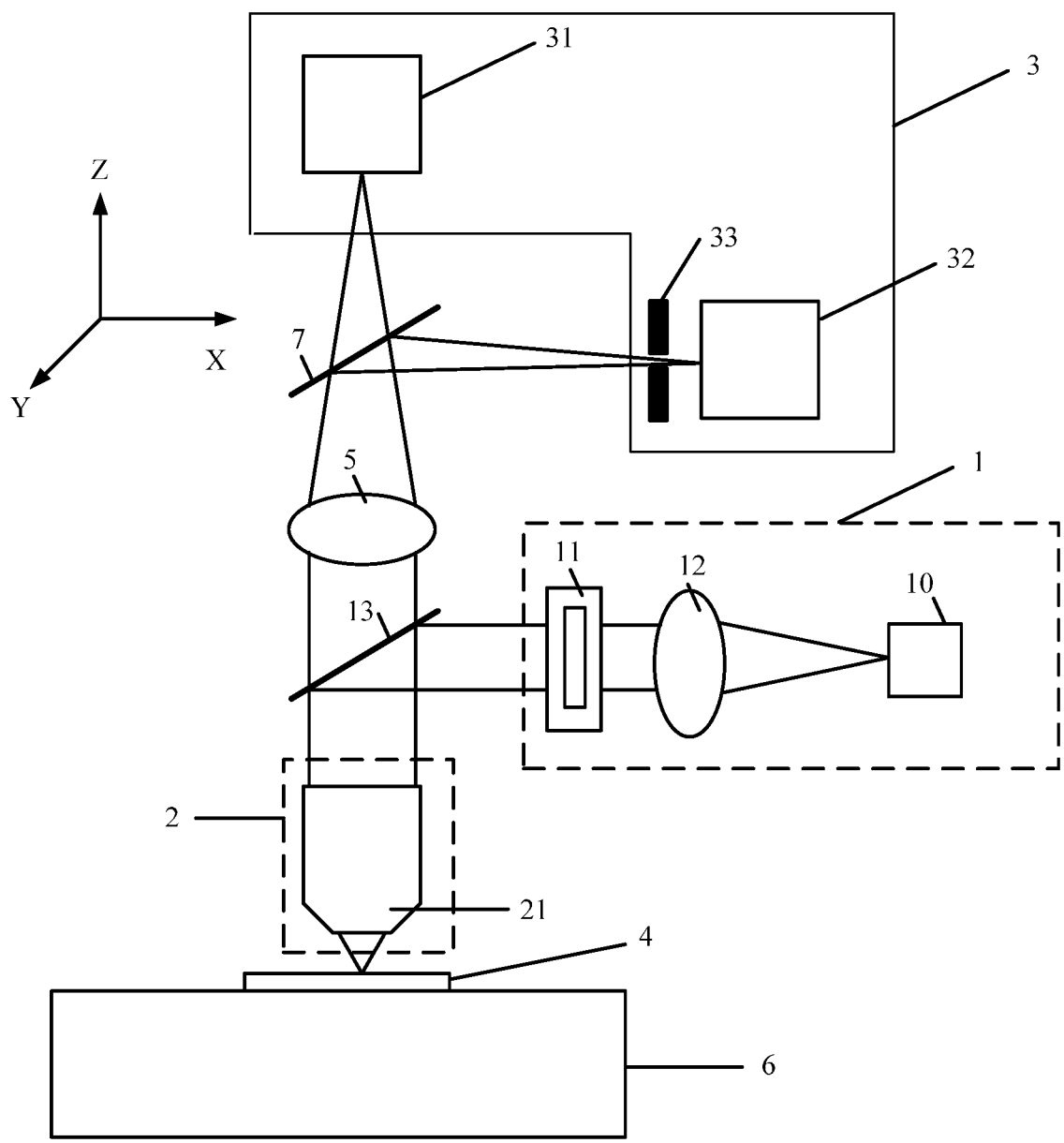
FIG. 12 is a schematic structural diagram of an optical detection apparatus according to an embodiment of the present disclosure.

In another embodiment of the present disclosure, as shown in FIG. 12, the projecting unit 2 includes a projecting device 23. After collecting reflected light from the object 4 to be detected, the projecting device 23 transmits the reflected light to the receiving unit 3. The reflected light is detection signal light emitted by the projecting device 23.

The structure information includes the film thickness information of the area to be detected of the object to be detected.

The receiving unit 3 includes a first receiving device 31 and a second receiving device 32. The first receiving device 31 obtains the image information of the object 4 to be detected based on the detection signal light. The second receiving device 32 obtains the film thickness information of the object 4 to be detected based on the detection signal light.

Optionally, the projecting device 23 is an imaging objective lens. The first receiving device 31 is an image sensor, for example, a CCD image sensor or a CMOS image sensor. The second receiving device 32 is a spectrometer.

In the apparatus shown in FIG. 12, the aperture limiting module 11 is removed from the light emitting path of the light source 10 first. The carrying platform 6 drives the object 4 to be detected to move to find an area to be detected of the object 4 to be detected. Then the light source 10 emits detection light. The projecting device 23 projects the detection light emitted by the light source 10 to the area to be detected of the object 4 to be detected, collects reflected light from the object 4 to be detected, and transmits the reflection light. The second receiving device 32 obtains image information of the object 4 to be detected based on the reflected light. The image information includes position and transverse dimension information of a structure to be detected in the area to be detected of the object 4 to be detected. The structure to be detected includes one or more of photoresist, a metal layer and a silicon through hole.

Then, the aperture limiting module 11 determines whether the area to be detected of the object 4 to be detected has a specific detection structure such as a high aspect ratio structure based on the image information, the aperture limiting module 11 is controlled to enter the light emitting path of the light source 10 in a case that the area to be detected has a specific detection structure such as a high aspect ratio structure, to limit an aperture of the detection light emitted by the light source 10, and the aperture limiting module 11 is controlled not to enter the light emitting path of the light source 10 in a case that the area to be detected does not have the specific detection structure such as a high aspect ratio structure.

Then, the projecting device 23 projects the detection light from the light source 10 or the aperture limiting module 11 to the surface of the object 4 to be detected, collects reflected light from the object 4 to be detected, and transmits the reflected light to the second receiving device 32. The second receiving device 32 obtains film thickness information of the object 4 to be detected based on the reflected light. The above steps are repeated until film thickness information of all objects to be detected of the object 4 to be detected is obtained.

It should be noted that in a case that the receiving unit 3 includes a first receiving device 31 and a second receiving device 32, the optical detection device further includes a second splitter 7. The second splitter 7 transmits part of the detection signal light to the first receiving device 31 and reflects part of the detection signal light to the second receiving device 32.

Optionally, each of the first splitter 13 and the second splitter 7 is a semi-reflective and semi-transmissive lens.

It should be noted that in a case that the projecting unit 2 includes the switching device 20, in a processing of detecting the object 4 to be detected, a three-dimensional contour and a film thickness of the object 4 to be detected can be detected by switching between the first projecting device 21 and the second projecting device 22 through the switching device 20. In this process, it is not required to transfer the object 4 to be detected between detection apparatuses, which not only avoids contamination that may be caused in a process of transferring the object 4 to be detected, reducing a probability that the object 4 to be detected is contaminated in the detection, but also improves a speed of detecting the object 4 to be detected as it is not required to determine areas to be detected of the object to be detected repeatedly.

With the optical detection apparatus and the optical detection method according to the present disclosure, structure information and image information of the object to be detected can be obtained. Based on the image information, whether an area to be detected of the object to be detected has a specific detection structure and a position of the specific detection structure can be determined, and the specific detection structure can be detected based on the position. In addition, an aperture limiting module may limit an aperture of detection light emitted by the light source, to block light at a large angle with the normal direction of the object to be detected, such that the light is incident to the detection area of the object to be detected along the normal direction of the object to be detected or along a direction at a small angle with the normal direction, thereby detecting the specific detection structure in the area to be detected effectively.

Figure 13:
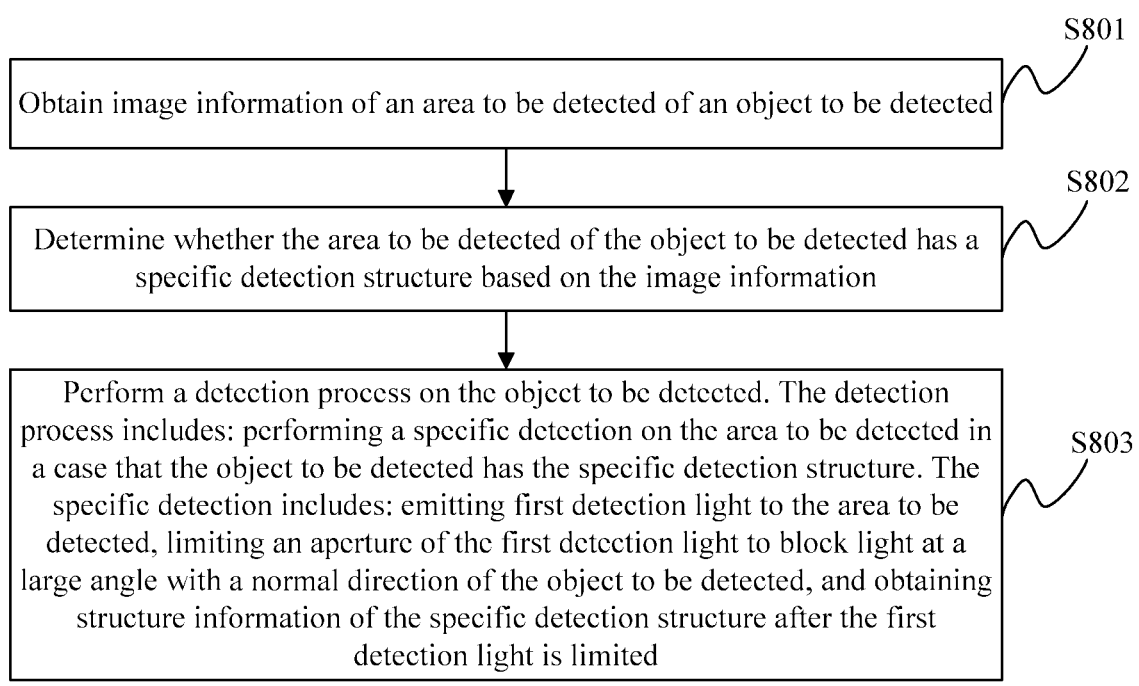
FIG. 13 is a flowchart of an optical detection method according to an embodiment of the present disclosure.

An optical detection method is further provided according to the embodiments of the present disclosure. As shown in FIG. 13, the optical detection method includes the following steps S801 to S803.

In step S801, image information of an area to be detected of an object to be detected is obtained.

In step S802, it is determined whether the area to be detected of the object to be detected has a specific detection structure based on the image information.

In step S803, a detection process is performed on the object to be detected. The detection process includes: performing a specific detection on the area to be detected in a case that the object to be detected has the specific detection structure. The specific detection includes: emitting first detection light to the area to be detected, limiting an aperture of the first detection light to block light at a large angle with a normal direction of the object to be detected, and obtaining structure information of the specific detection structure after the first detection light is limited.

The specific detection structure includes a high aspect ratio structure. Optionally, an aspect ratio of the high aspect ratio structure is greater than 20.

Optionally, in the optical detection method according to the embodiments of the present disclosure, the object to be detected includes multiple areas to be detected.

Before the detection process is performed on the object to be detected, the optical detection method further includes: repeating the steps of obtaining image information and determining whether an area to be detected has a specific detection structure.

The specific detection further includes: obtaining position information of the specific structure based on the image information, and obtaining the structure information of the specific structure based on the position information.

The optical detection method may also include: repeating the steps from obtaining image information of an area to be detected of an object to be detected to performing a detection process, including:

determining, after obtaining image information of a previous area to be detected and before obtaining image information of an area to be detected following the previous area to be detected, whether the previous area to be detected has the specific detection structure based on the image information of the previous area to be detected, and performing the specific detection on the previous area to be detected in a case that the previous area to be detected has the specific detection structure.

That is, in an embodiment of the present disclosure, image information of an area to be detected of the object to be detected may be obtained first, and then it is determined whether the area to be detected has a specific detection structure. Position information of the specific detection structure is obtained in a case that it is determined that the area to be detected has the specific detection structure. The above two steps are repeated until position information of specific detection structures in all areas to be detected is obtained. Then structure information of the specific detection structure is obtained based on the position information.

In another embodiment of the present disclosure, image information of an area to be detected may be obtained. Then, it is determined whether the area to be detected has a specific detection structure based on the image information of the area to be detected. The specific detection is performed on the area to be detected in a case that the area to be detected has the specific detection structure. Then image information of a next area to be detected is obtained and subsequent steps are repeated.

Optionally, the optical detection method according to the embodiments of the present disclosure may be applied to the optical detection apparatus according to any one of the embodiments described above. The detection light includes the first detection light or second detection light. The step of obtaining the image information of the area to be detected of the object to be detected includes:

emitting, by the light source, the second detection light, projecting, by the projecting device, the second detection light to the surface of the object to be detected, collecting reflected light formed by the object to be detected reflecting the detection light, emitting detection signal light, and receiving, by the receiving unit, the detection signal light and obtaining the image information of the area to be detected of the object to be detected based on the detection signal light.

The step of obtaining the structure information of the specific detection structure in the specific detection includes:

collecting, by the projecting device, detection signal light formed by the specific detection structure reflecting the first detection light, and obtaining, by the receiving unit, the structure information of the specific detection structure based on the detection signal light.

In practice, the present disclosure is not limited to the above. In other embodiments, the image information of the object to be detected may be obtained through other apparatuses or devices. In other embodiments, whether an area to be detected of the object to be detected has a specific detection structure may be determined by the controller of the aperture limiting module based on the image information. Alternatively, whether an area to be detected of the object to be detected has a specific detection structure may be determined manually based on the image information.

Further, limiting the aperture of the first detection light includes:

moving the aperture limiting module into the light emitting path of the light source, to limit the aperture of the first detection light.

Further, the projecting unit includes a first projecting device, a second projecting device and a switching device. Before the detection light is projected to the surface of the object to be detected, the step of obtaining the image information includes: controlling the second projecting device to enter the light emitting path of the light source.

The specific detection further includes: controlling, by means of the switching device, the first projecting device to enter the light emitting path of the light source and the second projecting device to move out of the light emitting path of the light source.

Further, the receiving unit includes a first receiving device and a second receiving device, the projecting unit includes a second projecting device, and the structure information includes film thickness information; and the optical detection method includes:

projecting, by the second projecting device, the second detection light to the surface of the object to be detected, collecting reflected light formed by the object to be detected reflecting the second detection light, and emitting detection signal light;

receiving, by the first receiving device, the detection signal light, and obtaining the image information of the area to be detected of the object to be detected based on the detection signal light; and collecting, by the second projecting device, detection signal light formed by the specific detection structure reflecting the first detection light, and obtaining, by the second receiving device, film thickness information of the specific detection structure.

In an embodiment of the present disclosure, referring to FIG. 8, a process of the optical detection is described below.

The aperture limiting module 11 is removed from the light emitting path of the light source 10 first. Then the carrying platform 6 drives the object 4 to be detected to move to find an area to be detected of the object 4 to be detected. Then the light source 10 emits second detection light. The projecting device in the projecting unit 2 projects the second detection light emitted by the light source 10 to the area to be detected of the object 4 to be detected, collects reflected light from the object 4 to be detected, and emits detection signal light. The receiving unit 3 obtains image information of the object 4 to be detected based on the detection signal light. The image information includes position and transverse dimension information of a structure to be detected in the area to be detected of the object 4 to be detected. The structure to be detected includes one or more of photoresist, a metal layer, and a silicon through hole.

Then, the controller of the aperture limiting module 11 determines whether the area to be detected of the object 4 to be detected has a specific detection structure such as a high aspect ratio structure based on the image information, controls the aperture limiting module 11 to enter the light emitting path of the light source 10 in a case that the area to be detected has a specific detection structure such as a high aspect ratio structure, to limit an aperture of the first detection light emitted by the light source 10, and obtains structure information of the specific detection structure such as the high aspect ratio structure after the first detection light is limited.

In a case that the area to be detected does not have a specific detection structure such as a high aspect ratio structure or in a case that a structure other than the specific structure in the area to be detected is under detection, the controller of the aperture limiting module 11 controls the aperture limiting module 11 not to enter the light emitting path of the light source 10.

Then, the projecting device in the projecting unit 2 projects the detection light from the light source 10 or from the aperture limiting module 11 to the surface of the object 4 to be detected, collects reflected light from the object 4 to be detected, and emits detection signal light. The receiving unit 3 obtains structure information of the object 4 to be detected based on the detection signal light. The structure information includes three-dimensional coordinate information and film thickness information.

The above steps are repeated until detections for all areas of the object 4 to be detected are completed.

In another embodiment of the present disclosure, referring to FIG. 9, a process of the optical detection is described below.

The aperture limiting module 11 is removed from the light emitting path of the light source 10 first. The switching device 20 switches the second projecting device 22 into the light emitting path of the light source 10. Then the carrying platform 6 drives the object 4 to be detected to move to find an area to be detected of the object 4 to be detected. Then the light source emits second detection light. The second projecting device 22 projects the second detection light emitted by the light source 10 to the area to be detected of the object 4 to be detected, collects reflected light from the object 4 to be detected, and transmits the reflected light. The first receiving device 31 obtains image information of the object 4 to be detected based on the reflected light. The image information includes position and transverse dimension information of a structure to be detected in the area to be detected of the object 4 to be detected. The structure to be detected includes one or more of photoresist, a metal layer and a silicon through hole.

Then, the controller of the aperture limiting module 11 determines whether the area to be detected of the object 4 to be detected has a specific detection structure such as a high aspect ratio structure based on the image information, controls the aperture limiting module 11 to enter the light emitting path of the light source 10 in a case that the area to be detected has a specific detection structure such as a high aspect ratio structure, to limit an aperture of the first detection light emitted by the light source 10, and obtains structure information of the specific detection structure such as the high aspect ratio structure after the first detection light is limited.

In a case that the area to be detected does not have the specific detection structure such as a high aspect ratio structure, the aperture limiting module 11 is controlled not to enter the light emitting path of the light source 10.

Then, the switching device 20 switches the first projecting device 21 into the light emitting path of the light source 10. The first projecting device 21 projects the detection light from the light source 10 or the aperture limiting module 11 to the surface of the object 4 to be detected, collects reflected light from the object 4 to be detected, causes the reflected light to interfere with reference light, and transmits interference light to the first receiving device 31. The first receiving device 31 obtains three-dimensional coordinate information of the object 4 to be detected based on the interference light.

The above steps are repeated until detections for all areas of the object 4 to be detected are completed.

In another embodiment of the present disclosure, referring to FIG. 11, after the image information of the object 4 to be detected is obtained, the aperture limiting module 11 determines whether the area to be detected of the object 4 to be detected has a specific detection structure such as a high aspect ratio structure based on the image information. After structure information of the specific detection structure such as the high aspect ratio structure is obtained, the second projecting device 22 projects the detection light emitted by the light source 10 to the surface of the object 4 to be detected, collects reflected light from the object 4 to be detected, and transmits the reflected light to the second receiving device 32. The second receiving device 32 obtains film thickness information of the object 4 to be detected based on the reflected light.

Then, the switching device 20 switches the first projecting device 21 into the light emitting path of the light source 10. The first projecting device 21 projects the detection light from the light source 10 or the aperture limiting module 11 to the surface of the object 4 to be detected, collects reflected light from the object 4 to be detected, causes the reflected light to interfere with reference light, and transmits interference light to the first receiving device 31. The first receiving device 31 obtains three-dimensional coordinate information of the object 4 to be detected based on the interference light. The above steps are repeated until surface film thickness information and three-dimensional coordinate information of all areas of the object 4 to be detected are obtained.

In another embodiment of the present disclosure, referring to FIG. 12, the aperture limiting module 11 is removed from the light emitting path of the light source 10 first. The carrying platform 6 drives the object 4 to be detected to move to find an area to be detected of the object 4 to be detected. Then the light source 10 emits second detection light. The projecting device 23 projects the second detection light emitted by the light source 10 to the area to be detected of the object 4 to be detected, collects reflected light from the object 4 to be detected, and transmits the reflection light. The second receiving device 32 obtains image information of the object 4 to be detected based on the reflected light. The image information includes position and transverse dimension information of a structure to be detected in the area to be detected of the object 4 to be detected. The structure to be detected includes one or more of photoresist, a metal layer and a silicon through hole.

Then, the aperture limiting module 11 determines whether the area to be detected of the object 4 to be detected has a specific detection structure such as a high aspect ratio structure based on the image information, the aperture limiting module 11 is controlled to enter the light emitting path of the light source 10 in a case that the area to be detected has a specific detection structure such as a high aspect ratio structure, to limit an aperture of the first detection light emitted by the light source 10, structure information of the specific detection structure such as the high aspect ratio structure is obtained after the first detection light is limited, and the aperture limiting module 11 is controlled not to enter the light emitting path of the light source 10 in a case that the area to be detected does not have the specific detection structure such as a high aspect ratio structure.

Then, the projecting device 23 projects the detection light from the light source 10 or the aperture limiting module 11 to the surface of the object 4 to be detected, collects reflected light from the object 4 to be detected, and transmits the reflected light to the second receiving device 32. The second receiving device 32 obtains film thickness information of the object 4 to be detected based on the reflected light. The above steps are repeated until film thickness information of all areas of the object 4 to be detected is obtained.

With the optical detection method according to the present disclosure, not only structure information and image information of the object to be detected can be obtained, but also whether an area to be detected of the object to be detected has a specific detection structure and a position of the specific detection structure can be determined based on the image information, and the specific detection structure can be detected based on the position. In addition, an aperture limiting module can limit an aperture of detection light emitted by the light source, to block light at a large angle with the normal direction of the object to be detected, such that the light is incident to the detection area of the object to be detected along the normal direction of the object to be detected or along a direction at a small angle with the normal direction, thereby detecting the specific detection structure in the area to be detected effectively.

The embodiments in this specification are described in a progressive way, each of which emphasizes the differences from others, and for the same or similar parts among the embodiments, one may refer to description of other embodiments. Since the devices disclosed in the embodiments correspond to the methods disclosed in the embodiments, the descriptions of the devices are relatively simple, and for relevant matters, one may refer to the descriptions of the method embodiments.

With the description of the embodiments disclosed above, those skilled in the art may implement or use technical solutions of the present disclosure. Numerous modifications to the embodiments are apparent to those skilled in the art, and the general principles defined herein may be implemented in other embodiments without departing from the spirit or scope of the present disclosure. Therefore, the present disclosure may not be limited to the embodiments described herein, but should comply with the widest scope consistent with the principles and novel features disclosed herein.

The invention claimed is:

1. A light emitting apparatus, comprising a light source and an aperture limiting unit arranged in a light emitting path of the light source, wherein:
    the light source is configured to emit light; and
    the aperture limiting unit comprises a first stop module, wherein the first stop module is configured to enter and leave the light emitting path of the light source, and limit an aperture of the light emitted by the light source when the first stop module is in the light emitting path of the light source, to block light at a large angle with a normal direction of an object to be detected;
    wherein the aperture limiting unit comprises a control device; and
    the control device is configured to control the first stop module to enter the light emitting path of the light source in a case that a current detection area of the object to be detected has a specific detection structure, and control the first stop module to leave the light emitting path of the light source in a case that the current detection area of the object to be detected has no specific detection structure.

2. The light emitting apparatus according to claim 1, wherein the aperture limiting unit comprises a control device, wherein:
    the control device is configured to control the first stop module to enter the light emitting path of the light source in a case that a current detection area of the object to be detected has a high aspect ratio structure, and control the first stop module to leave the light emitting path of the light source in a case that the current detection area of the object to be detected has no high aspect ratio structure.

3. The light emitting apparatus according to claim 2, further comprising an objective lens,
    wherein the objective lens is configured to receive light from the first stop module or the light source and project the received light onto a surface of the object to be detected;
    wherein the first stop module comprises a first stop, wherein in a case that the first stop module is in the light emitting path of the light source, the first stop is at an entrance pupil of the objective lens; or
    the first stop module comprises a first stop and a matching lens, wherein in a case that the first stop module is in the light emitting path of the light source, the matching lens forms an image of the first stop at the entrance pupil of the objective lens.

4. The light emitting apparatus according to claim 2, wherein the control device comprises a controller and a first movable device, and
    the controller is configured to determine whether the current detection area has a high aspect ratio structure based on pre-stored structure data of the object to be detected, send a first control instruction to the first movable device in a case that the current detection area has a high aspect ratio structure, to control the first movable device to drive the first stop module to enter the light emitting path of the light source, and send a second control instruction to the first movable device in a case that the current detection area has no high aspect ratio structure, to control the first movable device to drive the first stop module to leave the light emitting path of the light source.

5. An optical detection system, comprising the light emitting apparatus according to claim 1 and a receiving device, wherein
light emitted by the light emitting apparatus is reflected by the object to be detected; and
the receiving device is configured to receive light reflected by the object to be detected and obtain structure information of the object to be detected based on the received light.

6. The optical detection system according to claim 5, wherein the light emitting apparatus comprises an objective lens and the optical detection system further comprises a first lens group, a beam splitter and a second lens group, wherein
the first lens group is configured to perform beam expansion and shaping on the light emitted by the light source;
the beam splitter is configured to reflect emergent light from the first lens group or the aperture limiting unit;
the objective lens is configured to focus the emergent light from the first lens group or the first stop module on the object to be detected and collect reflected light from the object to be detected;
the beam splitter is further configured to transmit emergent light from the objective lens to the second lens group; and
the second lens group is configured to converge the emergent light from the objective lens to the receiving device.

7. The optical detection system according to claim 6, wherein the objective lens is an interference objective lens, the receiving device is a photoelectric detector, and the optical detection system further comprises a movable device, wherein
the interference objective lens is further configured to, after collecting the reflected light from the object to be detected, cause the reflected light to interfere with reference light, and transmit interference light to the beam splitter;
the movable device is configured to drive the interference objective lens or the object to be detected to move along a direction perpendicular to the object to be detected; and
the photoelectric detector is configured to reconstruct a three-dimensional surface contour of the object to be detected based on received interference light.

8. The optical detection system according to claim 6, wherein the objective lens is an imaging objective lens, the receiving device is a spectrometer, and a stop is arranged at a light inlet of the spectrometer, wherein
the stop is configured to limit an aperture of emergent light entering the spectrometer; and
the spectrometer is configured to obtain film thickness information of the object to be detected based on the emergent light.

9. An optical detection method applied to the optical detection system according to claim 5, wherein the method comprises:
emitting light by the light source; and
moving the first stop module in the aperture limiting unit into the light emitting path of the light source to limit the aperture of the light emitted by the light source, to block light at a large angle with the normal direction of the object to be detected;
wherein the aperture limiting unit comprises a control device and the method further comprises:
controlling, by the control device in a case that the current detection area of the object to be detected has a specific detection structure, the first stop module to enter the light emitting path of the light source; or
controlling, by the control device in a case that the current detection area of the object to be detected has no specific detection structure, the first stop module to leave the light emitting path of the light source.

10. The optical detection method according to claim 9, wherein the aperture limiting unit comprises a control device and the method further comprises:
controlling, by the control device in a case that the current detection area of the object to be detected has a high aspect ratio structure, the first stop module to enter the light emitting path of the light source; or
controlling, by the control device in a case that the current detection area of the object to be detected has no high aspect ratio structure, the first stop module to leave the light emitting path of the light source.

11. The optical detection method according to claim 10, wherein
the light emitting apparatus comprises an objective lens and the first stop module comprises a first stop, the step of controlling the first stop module to enter the light emitting path of the light source comprises: arranging the first stop at an entrance pupil of the objective lens; and
in a case that the light emitting apparatus comprises an objective lens and the first stop module comprises a first stop and a matching lens, the step of controlling the first stop module to enter the light emitting path of the light source comprises: rendering an image of the first stop formed by the matching lens at the entrance pupil of the objective lens.

12. The optical detection method according to claim 10, wherein the control device comprises a controller and a first movable device, and the method further comprises:
determining, by the controller based on pre-stored structure data of the object to be detected, whether the current detection area has a high aspect ratio structure;
sending, by the controller in a case that the current detection area has a high aspect ratio structure, a first control instruction to the first movable device, to control the first movable device to drive the first stop module to enter the light emitting path of the light source; and
sending, by the controller in a case that the current detection area has no high aspect ratio structure, a second control instruction to the first movable device to control the first movable device to drive the first stop module to leave the light emitting path of the light source.

13. An optical detection apparatus, comprising a light source module, a projector, and a receiver, wherein the light source module comprises a light source and an aperture limiting module, wherein:

the light source is configured to emit detection light;
the aperture limiting module is configured to enter and leave a light emitting path of the light source, and limit an aperture of the detection light emitted by the light source when the aperture limiting module is in the light emitting path of the light source, to block light at a large angle with a normal direction of an object to be detected;
the projector comprises at least one projecting device, wherein the projecting device is configured to project the detection light emitted by the light source module to a surface of the object to be detected, collect reflected light from the object to be detected, and emit detection signal light; and
the receiver is configured to receive the detection signal light and obtain image information and structure information of an area to be detected of the object to be detected based on the detection signal light;
wherein the apparatus further comprises a first movable device and a controller;
the first movable device is configured to control the aperture limiting module to enter and leave the light emitting path of the light source; and
the controller is configured to determine, based on the image information, whether the area to be detected of the object to be detected has a specific detection structure, and send, in a case that the area to be detected has the specific detection structure, a first control instruction to the first movable device, to control the first movable device to drive the aperture limiting module to enter the light emitting path of the light source.

14. The apparatus according to claim 13, wherein
the at least one projecting device is an objective lens,
wherein the aperture limiting module comprises a first stop, wherein in a case that the aperture limiting module is in the light emitting path of the light source, the first stop is at an entrance pupil of the objective lens; or
the aperture limiting module comprises a first stop and a matching lens, wherein in a case that the aperture limiting module is in the light emitting path of the light source, the matching lens forms an image of the first stop at the entrance pupil of the objective lens.

15. The apparatus according to claim 13, wherein the specific detection structure comprises a high aspect ratio structure.

16. The apparatus according to claim 13, wherein the projector comprises a switching device and at least two projecting devices,
the switching device is configured to switch between projecting devices in the light emitting path of the light source module, and
different projecting devices emit different detection signal light.

17. The apparatus according to claim 16, wherein the at least two projecting devices comprise a first projecting device and a second projecting device,
the first projecting device is configured to project part of the detection light emitted by the light source module to the surface of the object to be detected, transform part of the detection light into reference light, collect reflected light formed by the object to be detected reflecting the detection light, cause the reflected light to interfere with the reference light, and transmit interference light to the receiver, wherein the interference light is detection signal light emitted by the first projecting device, and
the second projecting device is configured to project the detection light emitted by the light source module to the surface of the object to be detected, collect reflected light from the object to be detected, and transmit the reflected light to the receiver, wherein the reflected light is detection signal light emitted by the second projecting device.

18. The apparatus according to claim 17, wherein the structure information comprises three-dimensional coordinate information of the object to be detected,
the receiver comprises a first receiving device, and
the first receiving device is configured to generate the three-dimensional coordinate information of the object to be detected based on the detection signal light from the first projecting device and generate the image information of the object to be detected based on the detection signal light from the second projecting device.

19. The apparatus according to claim 18, wherein the structure information further comprises film thickness information of the area to be detected,
the receiver further comprises a second receiving device, and
the second receiving device obtains the film thickness information of the area to be detected of the object to be detected based on the detection signal light from the second projecting device.

20. The apparatus according to claim 17, wherein the first projecting device is an interference objective lens, the second projecting device is an imaging objective lens, and a first receiving device is an image sensor.

21. The apparatus according to claim 13, wherein
the projector comprises a projecting device, wherein the projecting device is configured to, after collecting the reflected light from the object to be detected, transmit the reflected light to the receiver, and the reflected light is detection signal light emitted by the projecting device,
the structure information comprises film thickness information of the area to be detected of the object to be detected,
the receiver comprises a first receiving device and a second receiving device,
the first receiving device is configured to obtain the image information of the object to be detected based on detection signal light, and
the second receiving device is configured to obtain the film thickness information of the object to be detected based on the detection signal light.

22. The apparatus according to claim 21, wherein the projecting device is an imaging objective lens, the first receiving device is an image sensor, and the second receiving device is a spectrometer.

23. An optical detection method, comprising:
obtaining image information of an area to be detected of an object to be detected;
determining whether the area to be detected has a specific detection structure based on the image information; and
performing a detection process on the object to be detected, wherein the detection process comprises: performing a specific detection on the area to be detected in a case that the object to be detected has the specific detection structure, wherein the specific detection comprises: emitting detection light to the area to be detected, limiting an aperture of the detection light to block light at a large angle with a normal direction of the object to be detected, and obtaining structure information of the specific detection structure after the detection light is limited.

24. The optical detection method according to claim 23, wherein
the object to be detected comprises a plurality of areas to be detected,
wherein before the detection process is performed on the object to be detected, the optical detection method further comprises: repeating the steps of obtaining image information and determining whether an area to be detected has a specific detection structure,
the specific detection further comprises: obtaining position information of the specific structure based on the image information, and obtaining the structure information of the specific structure based on the position information; or
wherein the optical detection method comprises:
obtaining image information of each of the plurality of area to be detected of the object to be detected;
determining, after obtaining image information of a previous area to be detected and before obtaining image information of an area to be detected following the previous area to be detected, whether the previous area to be detected has the specific detection structure based on the image information of the previous area to be detected, and performing the specific detection on the previous area to be detected in a case that the previous area to be detected has the specific detection structure.

25. The optical detection method according to claim 23, wherein the optical detection method is applied to the optical detection apparatus according to claim 13, and the step of obtaining the image information of the area to be detected of the object to be detected comprises:
emitting, by the light source, the detection light,
projecting, by the at least one projecting device, the detection light to the surface of the object to be detected, collecting reflected light formed by the object to be detected reflecting the detection light, emitting detection signal light, and
receiving, by the receiver, the detection signal light and obtaining the image information of the area to be detected of the object to be detected based on the detection signal light, and
the step of obtaining the structure information of the specific detection structure in the specific detection comprises:
collecting, by the at least one projecting device, detection signal light formed by the specific detection structure reflecting the detection light, and
obtaining, by the receiver, the structure information of the specific detection structure based on the detection signal light.

26. The optical detection method according to claim 25, wherein the step of limiting the aperture of the detection light comprises:
moving the aperture limiting module into the light emitting path of the light source, to limit the aperture of the detection light.

27. The optical detection method according to claim 25, wherein
the projector comprises a first projecting device, a second projecting device and a switching device,
before the detection light is projected to the surface of the object to be detected, the step of obtaining the image information comprises: controlling the second projecting device to enter the light emitting path of the light source, and
the specific detection further comprises: controlling, by means of the switching device, the first projecting device to enter the light emitting path of the light source and the second projecting device to move out of the light emitting path of the light source.

28. The optical detection method according to claim 25, wherein the receiver comprises a first receiving device and a second receiving device, the projector comprises a second projecting device, the structure information comprises film thickness information, and
the optical detection method includes:
projecting, by the second projecting device, the detection light to the surface of the object to be detected, collecting the reflected light formed by the object to be detected reflecting the detection light, and emitting detection signal light;
receiving, by the first receiving device, the detection signal light, and obtaining the image information of the area to be detected of the object to be detected based on the detection signal light; and
collecting, by the second projecting device, the detection signal light formed by the specific detection structure reflecting the detection light, and obtaining, by the second receiving device, film thickness information of the specific detection structure.

* * * * *